(12) United States Patent
Hakamada et al.

(10) Patent No.: US 6,343,680 B1
(45) Date of Patent: Feb. 5, 2002

(54) FRICTION CLUTCH

(75) Inventors: Naoki Hakamada; Mikio Matsuda, both of Nishio; Junichi Ohguchi, Toyoake; Yuuichi Aoki, Chita-gun; Hiroyasu Sakamoto, Chiryu; Naoto Agata, Toyoake; Naoji Konaga, Okazaki, all of (JP)

(73) Assignees: Denso Corporation, Kariya; Nippon Soken, Inc., Nishio, both of (JP)

( * ) Notice: Subject to any disclaimer, the term of this patent is extended or adjusted under 35 U.S.C. 154(b) by 0 days.

(21) Appl. No.: 09/517,749

(22) Filed: Mar. 3, 2000

(30) Foreign Application Priority Data

| Mar. 5, 1999 | (JP) | ............................................. 11-058675 |
| Nov. 10, 1999 | (JP) | ............................................. 11-319750 |
| Feb. 25, 2000 | (JP) | ............................................. 12-054405 |

(51) Int. Cl.$^7$ ........................ F16D 27/112; F16D 13/00
(52) U.S. Cl. ..................... 192/35; 192/84.7; 192/84.961
(58) Field of Search .................. 192/35, 84.7, 84.961, 192/37, 40, 48.2, 48.3, 75

(56) References Cited

U.S. PATENT DOCUMENTS 4,201,281 A * 5/1980 MacDonald ................. 192/35
4,524,854 A * 6/1985 Miller ..................... 192/110 R
4,589,536 A * 5/1986 Strikis et al. .................. 192/35

FOREIGN PATENT DOCUMENTS

JP         8-74885        3/1996

* cited by examiner

Primary Examiner—Charles A Marmor
Assistant Examiner—Saúl Rodríguez
(74) Attorney, Agent, or Firm—Pillsbury Winthrop LLP

(57) ABSTRACT

A friction clutch such as an electromagnetic clutch, in which a driving friction surface is formed on a rotor integral with a rotationally driven pulley and a driven friction surface in opposed relation to the driving friction surface is formed on an intermediate member pivotally mounted on a boss by a pin, is disclosed. When the rotor is in rotation, the armature portion of the intermediate member is attracted by an initial energizing means for generating a comparatively small force such as an electromagnetic coil so that the intermediate member is rotated around the pin. When the friction surface of the intermediate member is lightly pressed against the friction surface of the rotor, the friction force exerted tangentially to the contact surface causes the intermediate member to rotate further around the pin and generate a large force along the normal. Thus, the friction force is increased thereby making it possible to transmit a large power from the rotor to the boss through the intermediate member.

17 Claims, 18 Drawing Sheets

FRICTION CLUTCH

BACKGROUND OF THE INVENTION

1. Field of the Invention

The present invention relates to a friction clutch having at least a pair of frictional power transmission surfaces such as an electromagnetic clutch suitably used for driving an automotive air-conditioning system.

2. Description of the Related Art

As described in Japanese Unexamined Patent Publication No. 8-74885, for example, in an electromagnetic clutch often-used, conventionally, for driving an automotive air-conditioning system, an armature, which is supported elastically and movably, is moved axially by the magnetic attraction force generated in a magnetic coil and pressed against a rotor thereby to generate a friction force between the armature and the rotor and thus to transmit a torque. This structure, however, requires a large pressure to be applied to the armature and hence a greater amount of current supplied thereto, thereby posing the problem of a bulky clutch with an increased cost.

SUMMARY OF THE INVENTION

In order to obviate the aforementioned problem of the prior art, the object of the invention is to provide a friction clutch or, specifically, an electromagnetic clutch having a new configuration in which a strong pressure is generated on the friction surfaces for transmitting a larger torque while reducing the size of the whole clutch by reducing the required magnetic force and thus reducing the size of the coil and the rotor providing a magnetic path.

According to the invention, as a means for solving the problem described above, there is provided a friction clutch comprising a rotor having a first friction surface supported rotatably around a driven shaft and rotated by an external power source, a boss mounted on the driven shaft, an intermediate member having a second friction surface adapted to engage, in contact, with the friction surface of the rotor and pivotally supported on the boss for converting the friction force generated with the friction surface of the rotor into the pressure against the rotor, and initial operating means for applying the initial force to the intermediate member for pressing the friction surface of the intermediate member against the friction surface of the rotor.

In this friction clutch, the rotational power is transmitted by engagement in contact between the friction surface formed on a drive-side rotor rotatably supported on the driven shaft or a portion adapted to be rotated integrally with the rotor and the friction surface formed on the intermediate member pivotally supported on the boss mounted on the driven shaft. When the friction surface of the intermediate member is pressed against the friction surface of the rotor by a comparatively small force generated in the initial operating means, the friction force acting between the friction surfaces rotates the intermediate member around the pivotal shaft, so that the friction force due to the initial torque is converted into a large pressure exceeding the pressure generated by the initial operating means, the friction surface of the intermediate member is strongly pressed against the friction surface of the rotor, and a strong frictional engaging force is generated between the two friction surfaces, thereby making it possible to transmit a large rotational power. In this way, a large frictional engaging force is obtained in spite of a small pressure generated in the initial operating means and, therefore, the initial operating means can be reduced in size, with the result that the whole clutch can be reduced in size and cost.

According to another aspect of the invention, as another means for solving the problem described above, there is provided a friction clutch comprising a rotor supported rotatably around a driven shaft and rotationally driven by an external power, a boss having a first friction surface and mounted on the driven shaft, an intermediate member having a second friction surface adapted for contact engagement with the friction surface of the boss and pivotally supported on the rotor for converting the friction force generated with the friction surface of the boss into a pressure against the boss, and initial operating means for applying to the intermediate member the initial power for pressing the friction surface of the intermediate member against the friction surface of the boss.

In this aspect of the friction clutch, the rotational driving power is transmitted by contact engagement between the friction surface formed on the boss mounted on the driven shaft and the friction surface formed on the intermediate member pivotally supported on the drive-side rotor. In this case, when the friction surface of the intermediate member is pressed against the friction surface of the rotor with a comparatively small force generated in the initial operating means, the friction force acting between these friction surfaces rotates the intermediate member around the pivotal shaft, so that the friction force due to the initial torque is converted into a large pressure exceeding the pressure generated by the initial operating means, the friction surface of the intermediate member is strongly pressed against the friction surface of the boss, and a strong frictional engaging force is generated between these friction surfaces, thereby making it possible to transmit a large rotational power. In this way, a large frictional engaging force is obtained in spite of a small pressure generated in the initial operating means, and therefore the initial operating means can be reduced in size with the result that the whole clutch can be reduced in size and cost.

As described above, in order to generate, between the two friction surfaces in sliding contact a large pressure exceeding the pressure generated in the initial operating means, a mechanism for moving the intermediate member is desirably adapted to move the second friction surface of the intermediate member at least in the direction along the normal to the first friction surface. For this purpose, the second friction surface of the intermediate member is arcuate and the point at which the intermediate member is rotatably and pivotally supported is displaced from the driven shaft providing the rotational center of the second friction surface, whereby the direction of movement of the intermediate member has a component in the direction along the normal to the first friction surface.

In the above cases, the friction clutch according to the invention can be an electromagnetic clutch employing a configuration in which an electromagnetic coil is used as the initial operating means and the armature of a magnetic material formed on the intermediate member is attracted by the magnetic force. As a specific result of forming the friction clutch according to the invention with an electromagnetic clutch, the requirement of a smaller magnetic force makes it possible to reduce the size of the rotor constituting a magnetic path by reducing the number of turns of the electromagnetic coil or by reducing the wire diameter and thereby to reduce the size of the whole clutch. With the friction clutch according to the invention, the rotor is formed in such a manner that the first friction surface is normal to the driven shaft or forms a cylindrical surface coaxial with the driven shaft, while the second friction surface is formed in the intermediate member in an opposed relation to the first friction surface. The electromagnetic coil may be formed as an immovable member fixedly on the housing or movably on the rotor in a rotatable manner. In the latter case, a sliding contact mechanism including a brush and a slip ring is provided to supply power to the electromagnetic coil.

In the case where the friction clutch according to the invention comprises a plurality of intermediate members, the intermediate members are mounted in such a manner that the angle between each pair of adjoining intermediate members around the driven shaft is uniform thereby to offset the forces acting in radial direction and thereby to reduce the burden on the bearing. Also, in the case where a plurality of intermediate members are involved, an elastic member is desirably mounted between an end of one intermediate member and an end of another intermediate member in order to urge the friction surface formed on the intermediate members away from the friction surface formed on the rotor. Further, a balancer is desirably mounted on each of the intermediate members so that the center of gravity of the intermediate members coincides with the rotational center thereof and thereby to prevent the intermediate members from rotating around the pivotal shaft as the rotational center due to the centrifugal force.

In the case where an electromagnetic clutch is used as a friction clutch according to this invention, the friction surface for transmitting the torque and the magnetic pole surface for forming a magnetic path (or the friction surface) can be provided not as a common part but as separate members at least on the intermediate members and/or the rotor. As a result, the friction surface and the magnetic pole surface can be formed of a material suitable for the respective members. Thus, a friction surface with a small wear and free of seizure and a magnetic pole surface having a small magnetic reactance and a strong magnetism can be formed without affecting each other, thereby making it possible to produce a large transmission ability and a highly efficient initial operation characteristic.

A rubber-like elastic member can be attached around the pin shaft for supporting the intermediate member rotatably and slightly movably along the axial direction of the driven shaft. This can prevent the fretting wear liable to develop on the surface of the pin and the surface of the hole for receiving the pin shaft.

The above and other objects, features and advantages will be made apparent by the detailed description taken in conjunction with the accompanying drawings, in which.

DESCRIPTION OF THE PREFERRED EMBODIMENTS

Figure 1:
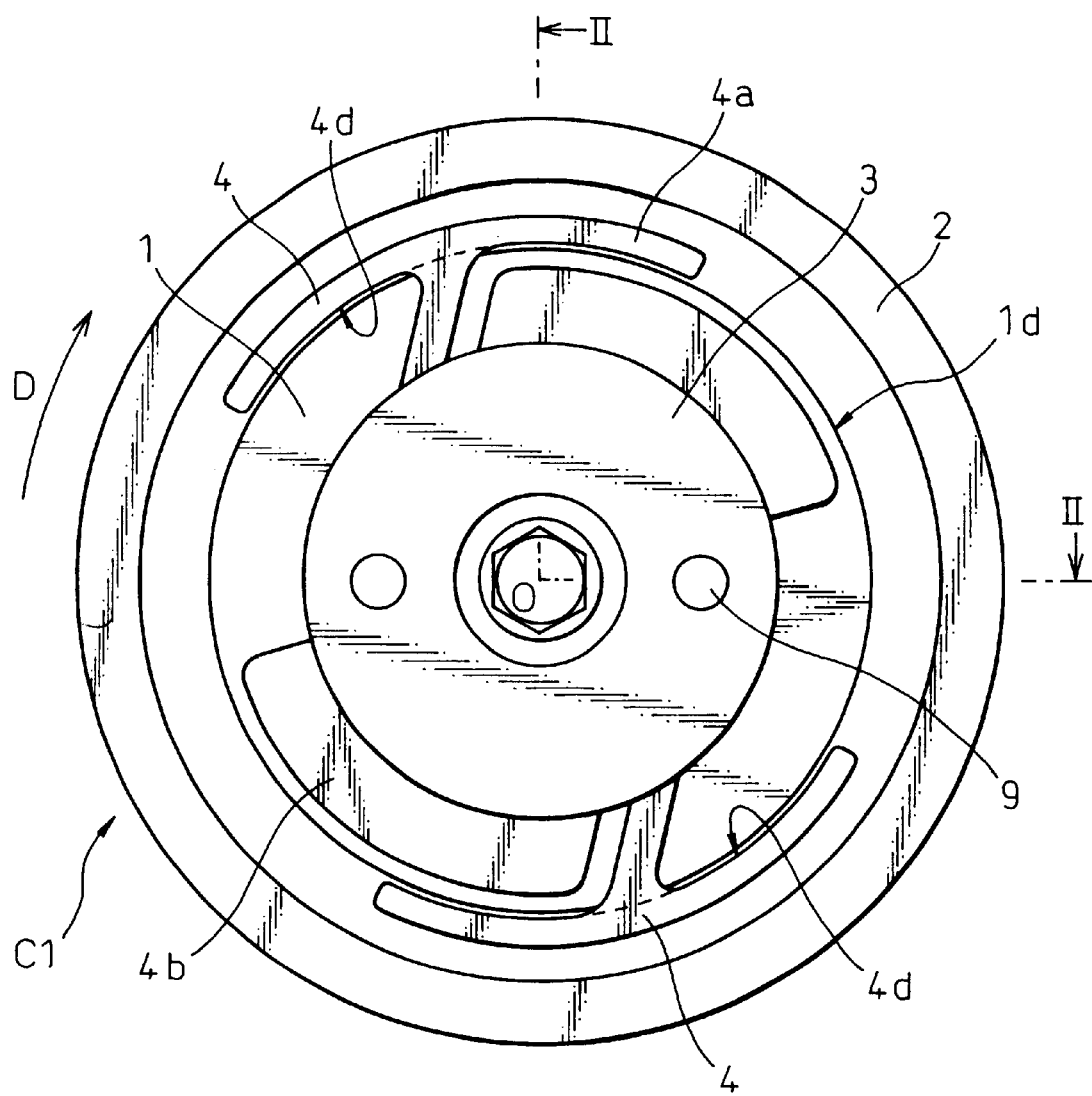
FIG. 1 is a front view of a friction clutch according to a first embodiment of the invention.
Figure 2:
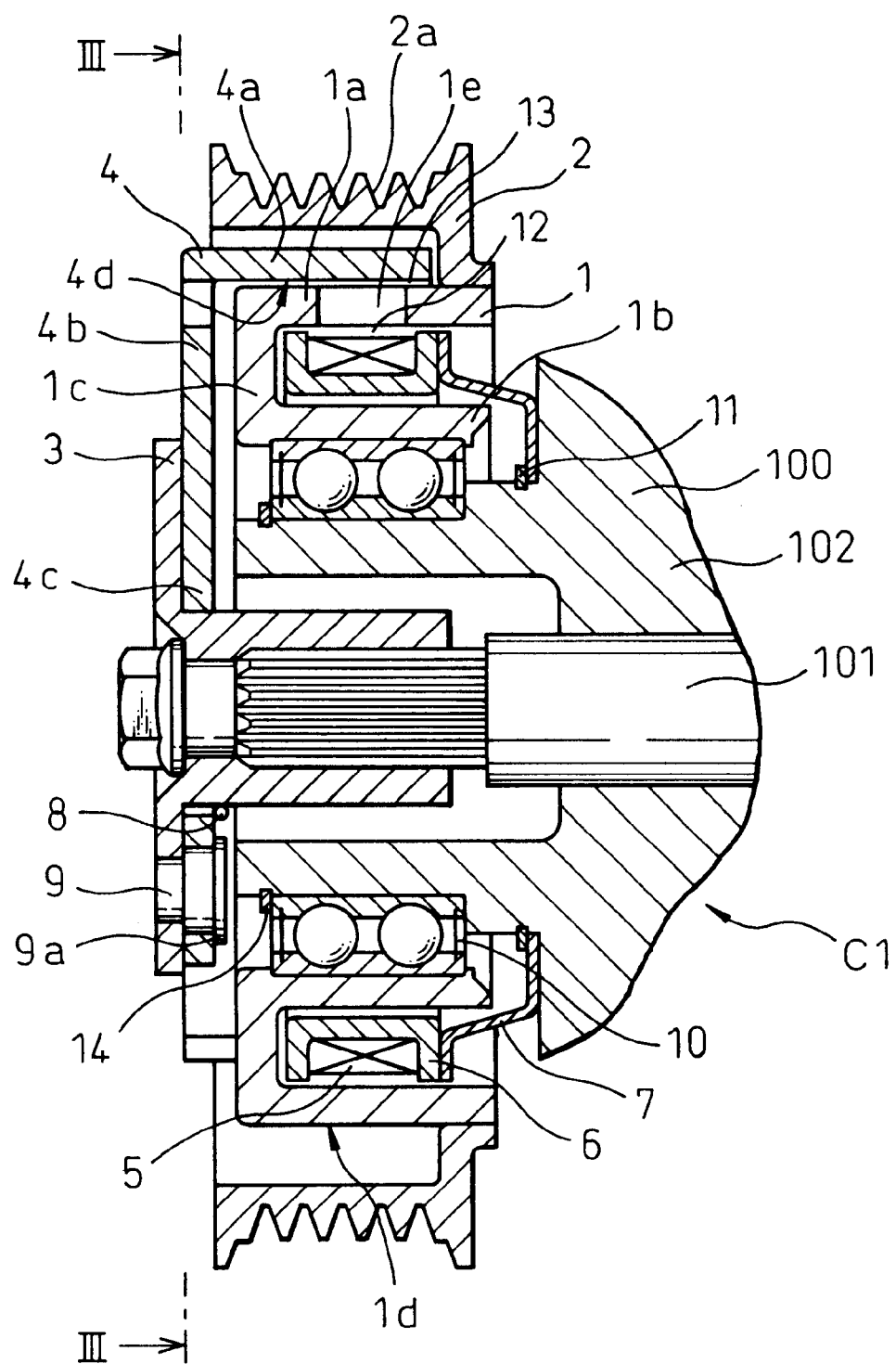
FIG. 2 is a sectional view of the friction clutch according to the first embodiment taken in line II-0-II in FIG. 1.
Figure 3:
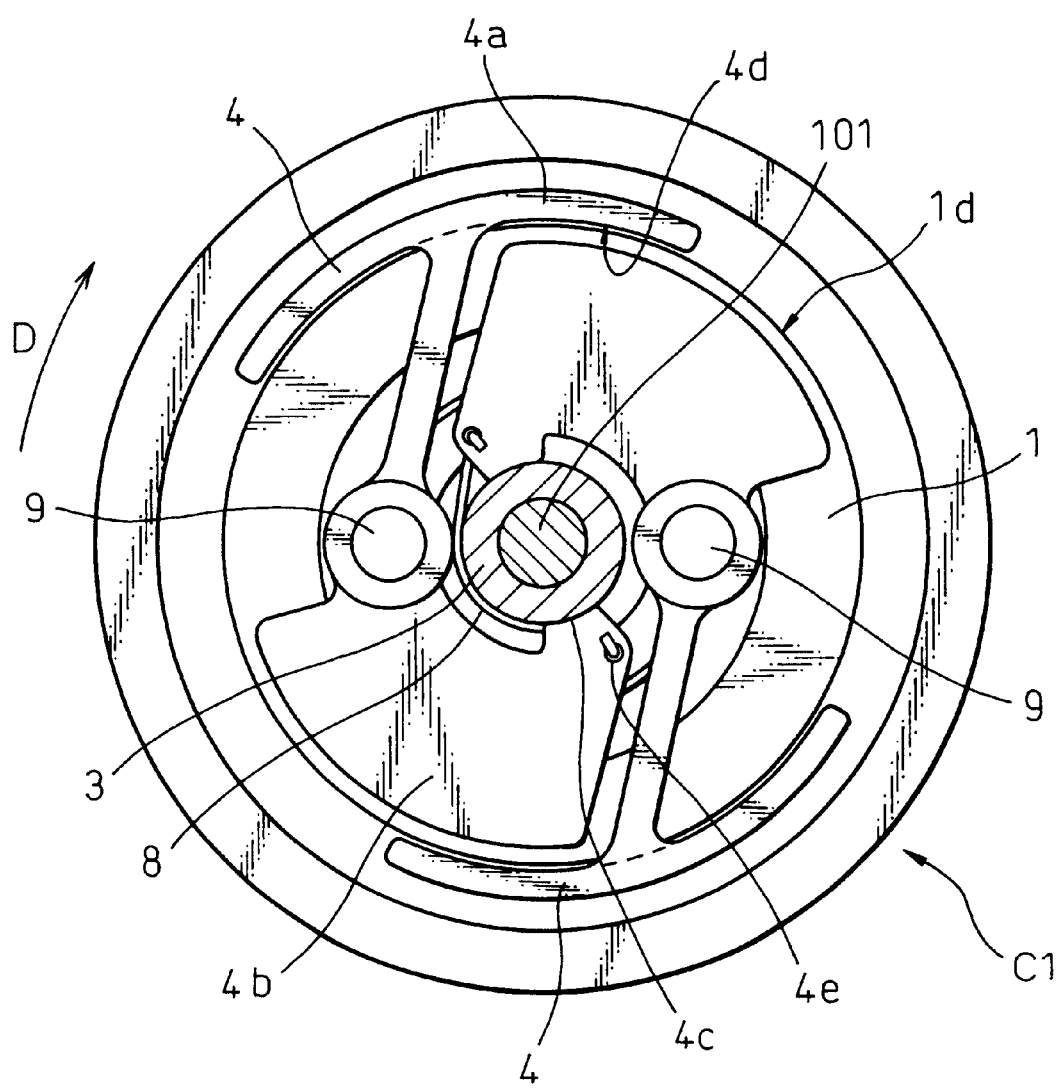
FIG. 3 is a sectional view of the friction clutch according to the first embodiment taken in line III-III in FIG. 2.

A detailed configuration of a friction clutch (electromagnetic clutch) C1 according to a first embodiment of the invention will be described with reference to the accompanying diagrams of FIGS. 1 to 3. FIG. 1 is a front view of the friction clutch C1 according to the first embodiment, and FIG. 2 is a sectional view taken in line II-0-II in FIG. 1.

The friction clutch C1 is mounted on a refrigerant compressor of an automotive air-conditioning system driven by an engine, not shown. Numeral 1 designates a rotor mounted on the compressor 100 and rotatable on the same axis as the driven shaft 101 doubling as the rotary shaft of the compressor 100 through a bearing 10. The peripheral edge portion of the rotor has a U-shaped section, and includes an outer cylindrical portion 1a and an inner cylindrical portion 1b coaxial with the driven shaft 101 and a disk portion (bottom portion) 1e perpendicular to the driven shaft 101. The outer cylindrical portion 1a is formed with a plurality of discrete slits 1e. The bearing 10, on the other hand, is supported on the cylindrical portion formed coaxially with the driven shaft 101 at the forward end of the housing 102 of the compressor 100, and fixedly secured by a snap ring 14.

Numeral 2 designates a pulley mounted on the outer cylindrical portion coaxially with the driven shaft 101. The pulley 2 is adapted to rotate integrally with the rotor 1 in the direction indicated by D in FIGS. 1 and 3, and has the outer peripheral portion formed with a V-groove 2a. A belt in such a shape as to engage the V-groove 2a is suspended between the pulley 2 and another pulley fixed on the engine output shaft, not shown. The turning effort of the engine is transmitted to the pulley 2 through this belt. Numeral 3 designates a disk-shaped boss integrally fitted in the forward end of the driven shaft 101 through a spline groove.

Numeral 4 designates an intermediate member mounted pivotally, i.e. rotatably on the boss 3 through a stepped pin 9. As clear from FIG. 3, an arcuate armature portion 4a is arranged at a position in an opposed relation to the outer cylindrical portion 1a of the rotor 1. At least the armature portion 4a or the whole intermediate member 4 is formed of an adsorbent magnetic material having a property of magnetic attraction. The stepped pin 9 is fixedly fitted in the hole of the boss 3. A small gap is left between the stepped pin 9 and the hole formed in the intermediate member 4, and therefore the intermediate member 4 can rotate around the stepped pin 9. Also, the pin 9 is provided with a flange portion 9a for blocking the motion of the intermediate member 4 along the axis thereof.

With the clutch out of engagement, an air gap 13 is formed between the armature portion 4a and the outer cylindrical portion 1a of the rotor. Also, the intermediate member 4 includes a balancer 4b and a stopper 4c. The balancer 4b causes the center of gravity of the intermediate member 4 to coincide with the rotational center on the boss 3, i.e. the center of the pin 9 and thereby prevents the intermediate member 4 from being rotated around the pin 9 by the centrifugal force acting on the intermediate member 4. The stopper 4c can be brought into contact with the boss 3. According to the first embodiment, there are two intermediate members 4, which are arranged 180 degrees apart from each other with respect to the center (driven shaft 101) so that the forces exerted on the rotor 1 radially by the two intermediate members 4 offset each other. In the case where three or more intermediate members 4 are arranged, on the other hand, the arrangement of the intermediate members with each pair of adjoining ones of them having the same angle around the center can offset the radial force as in the first embodiment.

Numeral 5 designates an electromagnetic coil fixedly arranged in the space 12 defined by the outer cylindrical portion 1a, the inner cylindrical portion 1b and the disk portion 1c of the rotor 1. The electromagnetic coil 5 is held by an annular coil holder 6 made of a magnetic material. In this embodiment, the electromagnetic coil 5 forms the "initial operating means". The outer cylindrical portion 1a and the intermediate members 4 rotate relatively with respect to the coil holder 6. These component parts constitute a series of magnetic paths (a magnetic circuit), and therefore upon magnetization by the energization of the electromagnetic coil 5, the armature portion 4a of each intermediate member 4 can be magnetically adsorbed on the friction surface 1d formed on the outer periphery of the outer cylindrical portion 1a of the rotor 1. The arcuate friction surface 4d of the armature portion 4a in an opposed relation to the friction surface 1d of the rotor 1 is formed in such a position that when the intermediate member 4 rotates in the same direction as the rotor 1 around the stepped pin 9, the friction surface 4d is pressed against the friction surface 1d of the rotor 1.

A mounting plate 7 is fixed on the housing 102 of the compressor by a snap ring 11. Numeral 8 designates a spring formed of an elastic metal wire in the first embodiment. The ends of the spring are bent and engage the mounting holes 4e formed at the ends of the intermediate members 4, respectively. As a result, the elastic force generated between the ends of the spring 8 rotates the intermediate members 4 around the pin 9, so that each friction surface 4d is forced away from the friction surface 1d of the rotor 1. The spring 8 can be replaced with an elastic member of rubber of the like.

Figure 4:
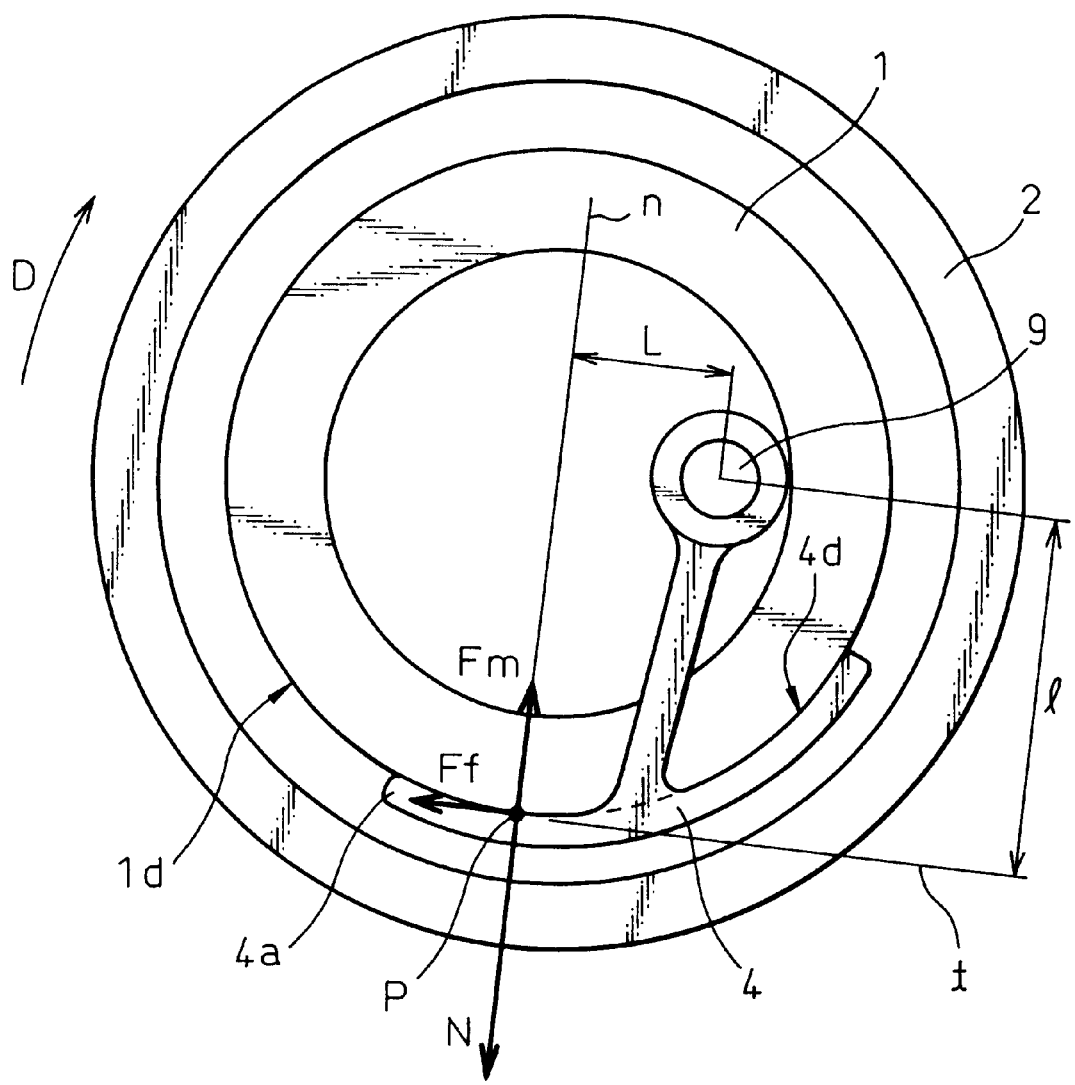
FIG. 4 is a front view showing the operating principle of a friction clutch according to the first embodiment.

Now, the effect and operation of the friction clutch C1 according to the first embodiment shown in FIGS. 1 to 3 will be explained with reference to FIG. 4.

Upon generation of magnetism with power supplied to the electromagnetic coil 5, a closed magnetic path is formed by the coil holder 6, the outer cylindrical portion 1a of the rotor 1 and the armature portion 4a of each intermediate member 4, so that the armature portion 4a is magnetically attracted toward the outer cylindrical portion 1a of the rotor. The armature portion 4a rotates around the pin 9 against the force of the spring 8 to such an extent that the friction surface 4d comes into contact with the friction surface 1d on the outer periphery of the rotor 1. As a result, the initial friction force Ff is generated as shown in FIG. 4, so that the torque transmitted to the pulley 2 is transmitted to the intermediate members 4 and further to the boss 3 through the pin 9. Since the boss 3 and the driven shaft 101 are coupled by a spline groove, the torque transmitted to the boss 3 is transmitted also to the driven shaft 101. In the process, the friction force Ff generates an angular moment to rotate the intermediate members 4 around the pin 9. Thus, the friction surface 4d is moved toward the friction surface id in such a manner as to wind around the friction surface 1d, and thus pressed with a stronger force.

The balance of forces under this condition at a given point on the friction surface 4d is calculated as follows. Let Ff be the friction force, Fm be the magnetic attraction force of the electromagnetic coil 5 acting on the armature portion 4a, N be the reaction exerted in radial direction, i.e. the pressure at the central point P of contact, l be the length of the leg of the normal from the center of the pin 9 on the tangential line to the arc of the friction surface id of the rotor 1 at point P, and L be the length of the leg of the normal from the center of the pin 9 on the straight line n perpendicular to the tangential line t at point P. Then from the balance of moment around the pin 9, $$Ff \cdot l + Fm \cdot L = N \cdot L \tag{1}$$

where it is assumed that the maximum value of the friction force Ff is given as Ffmax, the reaction of the armature is Nmax and the friction coefficient between the friction surface 4d and the friction surface 1d on the rotor 1 side is given as $\mu$. Then, the relation holds that $$Ffmax = \mu \cdot Nmax \tag{2}$$

From equations (1) and (2), the maximum value Nmax of the reaction N is given as $$Nmax = Fm/(1 - \mu \cdot l/L) \tag{3}$$

As can be seen from this relation, when the armature is attracted by the magnetic attraction force Fm, the maximum value of the radial reaction (pressure) acting on the armature portion 4a is greater than the magnetic attraction force Fm by a factor of $1/(1-\mu \cdot l/L)$.

Assuming, for example, that l=4 cm and L=2 cm when $\mu$=0.25. The pressure exerted on the friction surface is twice as large as the magnetic attraction force Fm. In this way, the pressure N in radial direction is exerted on the rotor 1 by the intermediate members 4. According to this invention, however, a plurality of intermediate members 4 are arranged around the driven shaft 101 as the center so that an equal angle is formed by each pair of the adjoining intermediate members 4, and thus the forces in the radial direction offset each other to not exert the force N on the bearing 10. As a result, the bearing 10 is not worn out early under a large pressure N, and therefore the reliability thereof is not adversely affected.

Also, according to this invention, the intermediate member 4 includes the balancer 4b so that the center of gravity of the intermediate member 4 coincides with the center axis of the pin 9. Even when the engine is running at high speed, therefore, a force pressing the friction surfaces 1d, 4d against each other or separating the same surfaces from each other is not generated by the centrifugal force, thereby making it possible to connect and disconnect the clutch smoothly.

When power to the electromagnetic coil is stopped, the magnetic attraction force Fm becomes zero, and from equation (3), the pressure N of the armature 4a also becomes zero. At the same time, in view of the fact that the friction surface 4d of the intermediate member 4 is urged away from the friction surface 1d of the rotor by the spring 8, the friction surface 4d comes away from the friction surface 1d so that the transmission of the torque by the clutch C1 is cut off.

As described above, the pressure N imparted by the friction surface 4d against the friction surface 1d can be increased at least to an amount equal to the magnetic attraction force Fm, and therefore the magnetic force to be generated by the electromagnetic coil 5 can be reduced. Thus the number of turns or the wire diameter of the electromagnetic coil 5 can be reduced, and the resulting size reduction can realize a smaller size and lower cost clutch as a whole.

Figure 5:
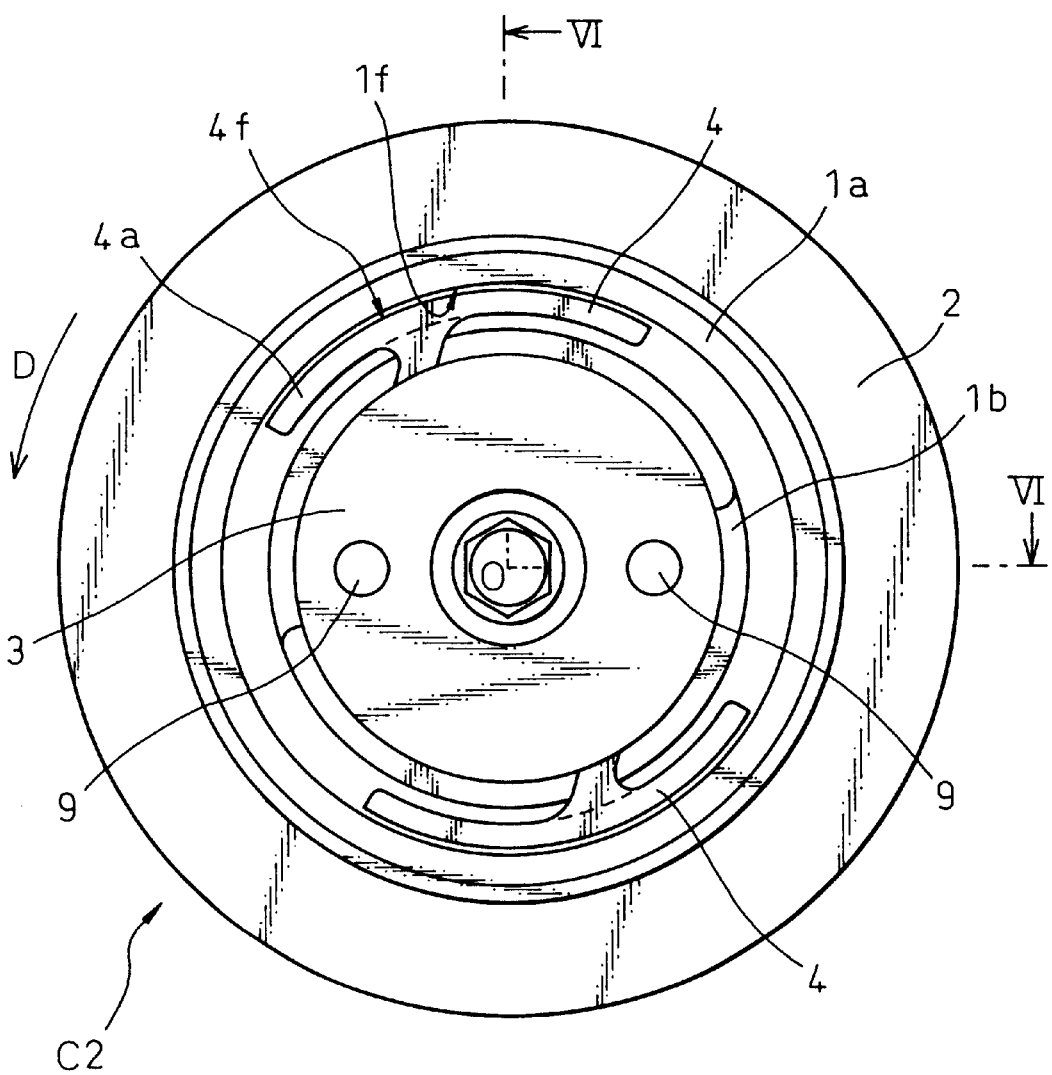
FIG. 5 is a front view of a friction clutch according to a second embodiment.
Figure 6:
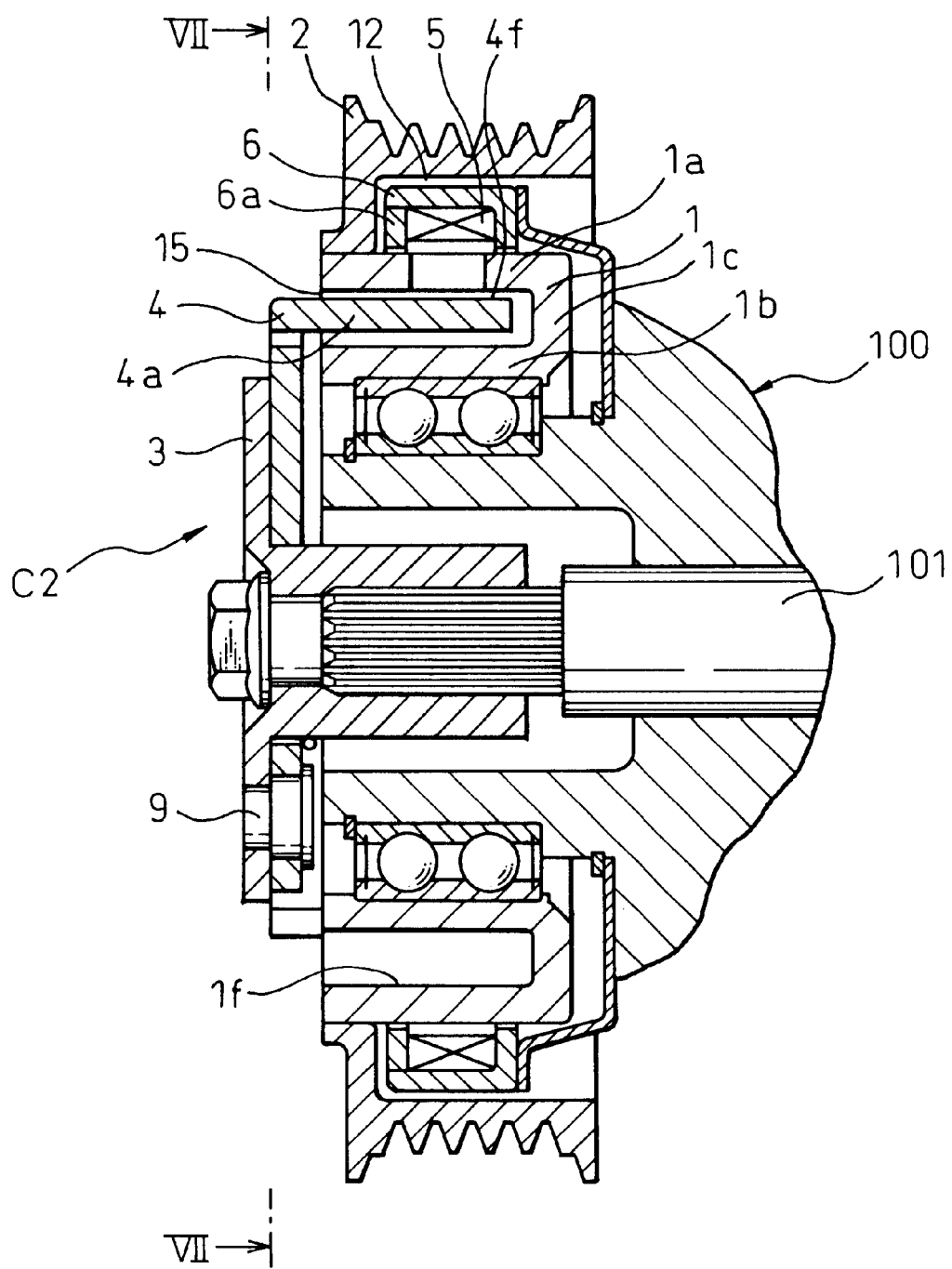
FIG. 6 is a sectional view of the friction clutch according to the second embodiment taken in line VI-0-VI in FIG. 5.

A detailed configuration and the effect of the operation of the friction clutch C2 according to the second embodiment of the invention will be explained with reference to FIGS. 5 to 7.

In the first embodiment, the electromagnetic coil 5 is arranged in the armature portion 4a so that the armature portion 4a is attracted radially inward. The second embodiment, on the other hand, is so configured that the armature portion 4a is attracted outward.

As in the first embodiment, the rotor 1 mounted on the same axis as the driven shaft 101 includes an outer cylindrical portion 1a, an inner cylindrical portion 1b and a disk portion 1c on the housing 102 side. A pulley 2 is fitted on the outer cylindrical portion 1a, and a space 12 is defined by the outer cylindrical portion 1a and the pulley 2. An annular electromagnetic coil 5 is arranged in the space 12. The electromagnetic coil 5 is arranged in a coil holder 6 including a cylindrical portion having an L-shaped section and a tabular disk portion. For holding the electromagnetic coil 5, an annular coil stopper 6a is fixedly fitted on the inner wall of the cylindrical portion of the coil holder 6.

Each intermediate member 4, as in the first embodiment, is rotatably mounted on the boss 3, and the armature portion 4a of the intermediate member 4 is arranged in an opposed relation to the inner surface of the outer cylindrical portion 1a of the rotor 1 in the air gap 15. The coil holder 6, the coil stopper 6a, the outer cylindrical portion 1a of the rotor and the armature portion 4a make up a magnetic path (magnetic circuit) for the magnetism generated in the electromagnetic coil 5, so that the armature portion 4a is attracted toward the outer cylindrical portion 1a of the rotor. The outer friction surface 4f of the armature portion 4a is formed in such a position as to come into contact with the friction surface 1f formed inside the outer cylindrical portion 1a of the rotor when the intermediate member 4 rotates around the stepped pin 9 in the same direction as the rotational direction D of the pulley 2 and the rotor 1. The contact between the friction surfaces 1f and 4f generates a friction force, and the friction surface 4f of the intermediate member 4 is pressed against the friction surface 1f of the rotor 1 from inside.

Figure 7:
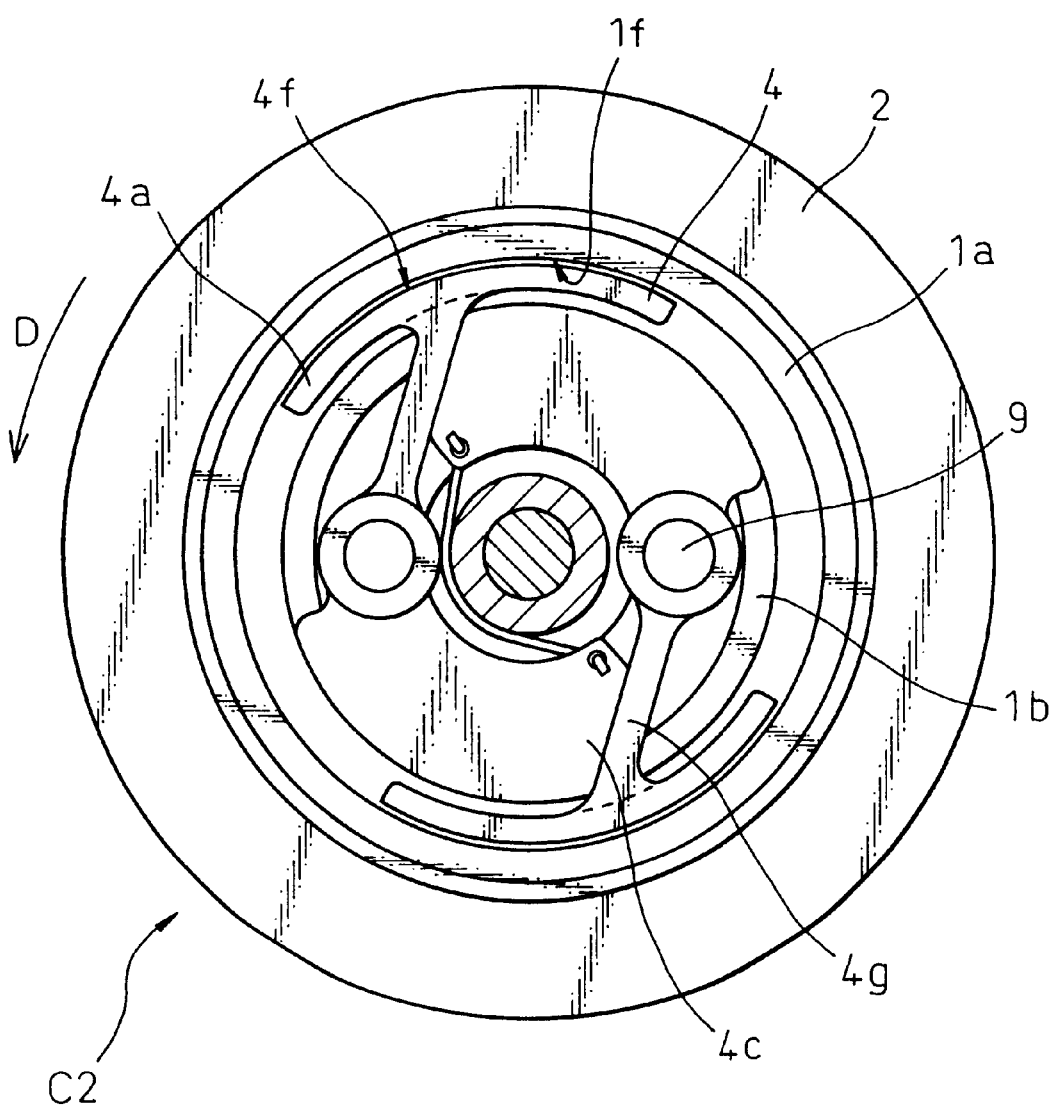
FIG. 7 is a sectional view of the friction clutch according to the second embodiment taken in line VII-VII in FIG. 6.

Also, a stopper 4c is arranged as shown in FIG. 7 at the end of each intermediate member 4 in such a position as to be adapted to come into contact with the arm portion 4g of the other intermediate member 4. When power is supplied to the electromagnetic coil 5, the intermediate members 4 rotate around the stepped pin 9, and the friction surfaces 1f and 4f come into contact with each other and generate a friction force therebetween. Then, a moment is generated around the pin 9, so that the friction surface 4f is pressed against the friction surface 1f of the rotor outward by the moment around the pin 9. As a result, the same effect as in the first embodiment is obtained.

Figure 8:
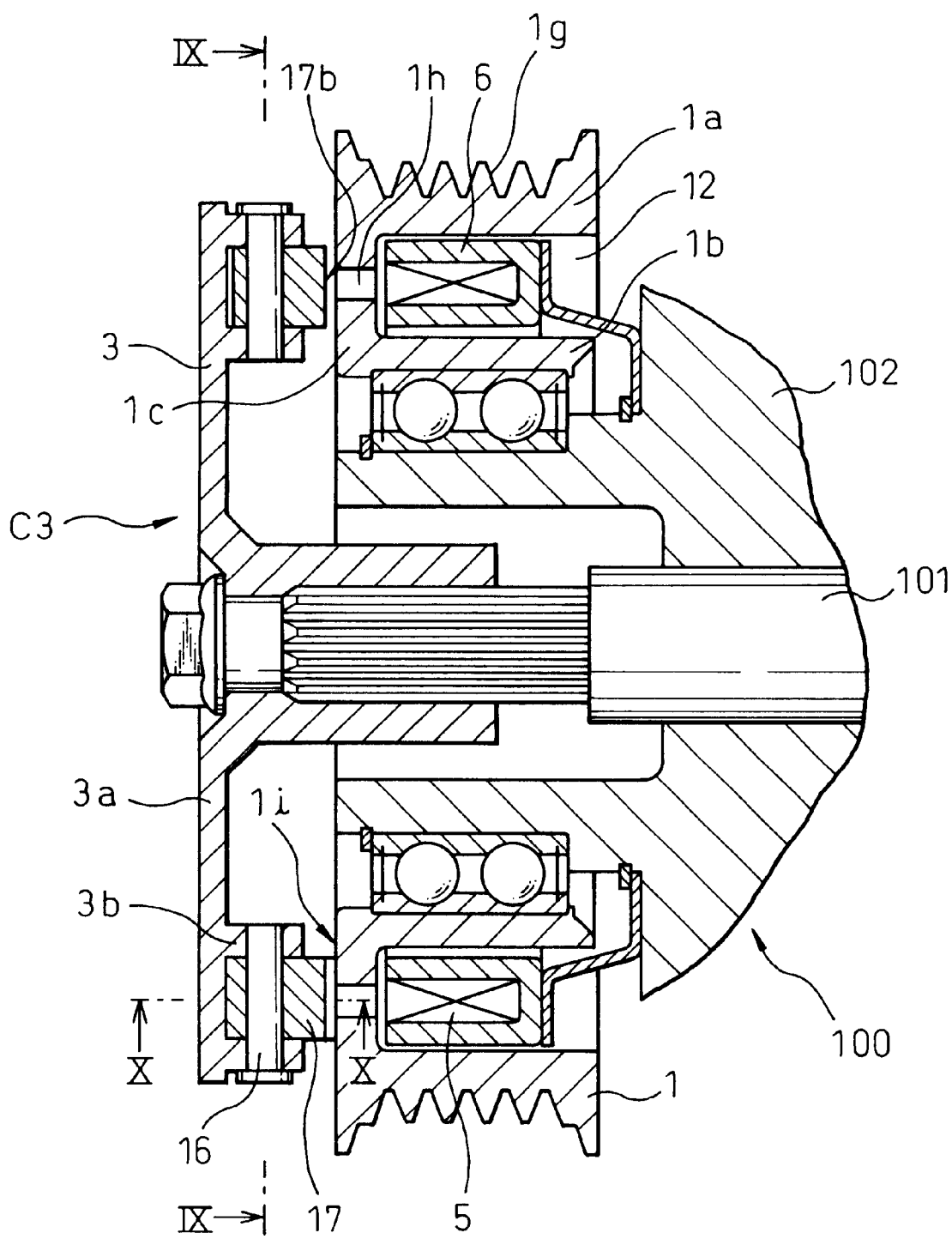
FIG. 8 is a longitudinal sectional view of a friction clutch according to a third embodiment.
Figure 9:
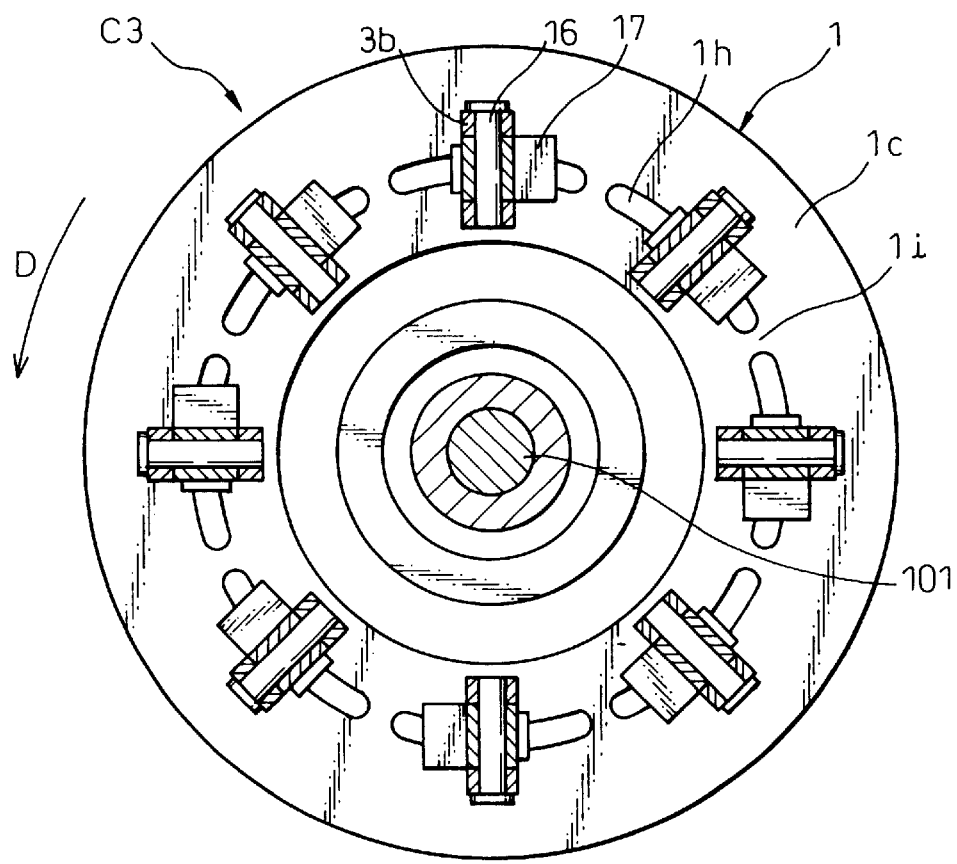
FIG. 9 is a sectional view of the friction clutch according to the third embodiment taken in line IX-IX in FIG. 8.
Figure 10:
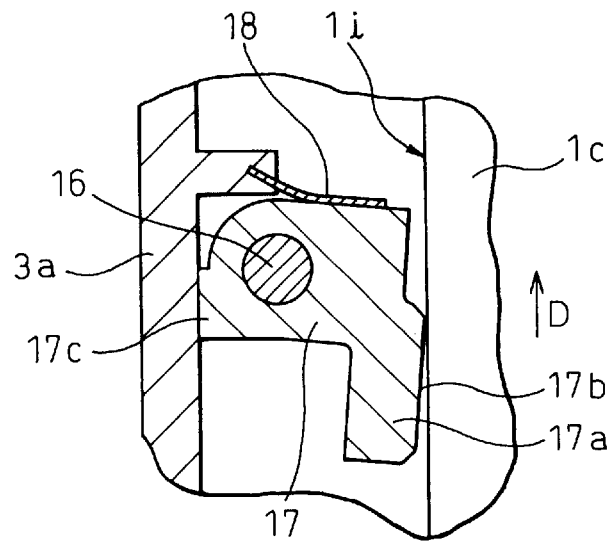
FIG. 10 is a sectional view of an intermediate member according to the third embodiment taken in line X-X in FIG. 8.

Now, a detailed configuration and the effect of the operation of the friction clutch C3 according to a third embodiment of the invention will be explained with reference to FIGS. 8 to 10.

The first and second embodiments are configured to generate such a force that the armature portion 4a of the intermediate member 4 is pressed in a radial direction. In the third embodiment, on the other hand, the pressure of the armature portion of the intermediate member is generated in the axial direction parallel to the driven shaft 101.

According to the third embodiment, as in the first embodiment, the rotor 1 mounted on the same axis as the driven shaft 101 includes an outer cylindrical portion 1a, an inner cylindrical portion 1b and a disk portion 1c located in opposed relation to the boss 3. The outer cylindrical portion 1a doubles as a pulley, and has an outer peripheral portion formed with a V-groove 1g. Also, the disk portion 1c has slits 1h discretely formed. An electromagnetic coil 5 held by a coil holder 6 is arranged in the space 12 formed by the outer cylindrical portion 1a, the inner cylindrical portion 1b and the disk portion 1c of the rotor 1.

The boss 3 is formed with a disk portion 3a perpendicular to the driven shaft 101. A plurality of pin supports 3b providing pairs of trunnions are protruded in axial direction from the disk portion 3a. Pins 16 are fitted securely in the pin supports 3b, respectively, in radial direction. Thus, as shown in FIG. 9, the center lines of the pins 16 are perpendicular to the center axial line of the driven shaft 101. The intermediate member 17 is mounted rotatably on each pin 16. As shown in FIG. 10 in enlarged form, the armature portion 17a of the intermediate member 17 is mounted at a position in opposed relation to the disk portion 1c of the rotor 1.

Numeral 18 designates a spring plate with an end thereof fixed to the disk portion 3a. The spring plate exerts a force in such a direction as to separate the armature portion 17a of the intermediate member 17 away from the outer friction surface 1i of the disk portion 1c of the rotor 1. Also, the intermediate member 17 has a stopper 17c in contact with the disk portion 3a of the boss 3. The intermediate member 17 has a friction surface 17b on the side opposite to the direction D of rotation of the rotor 1 with respect to the pin 16 providing the center of rotation.

Upon generation of magnetism in the electromagnetic coil 5 supplied with power, the coil holder 6, the disk portion 1c of the rotor 1 and the armature portion 17a of the intermediate member 17 form a series of magnetic paths, thereby generating a magnetic force for attracting the armature portion 17a of the intermediate member 17 toward the disk portion 1c of the rotor 1. The friction surface 17b of the armature portion 17a of the intermediate member 17 attracted by this magnetic force comes into contact with the friction surface 1*i* formed on the disk portion 1*c* of the rotor 1 to thereby generate a friction force. This friction force generates a moment about the pin 16 and increases the force in the direction of pressing the armature portion 17*c* against the friction surface 1*i* on the rotor 1 side, thereby producing an effect similar to that of the first embodiment.

Figure 11:
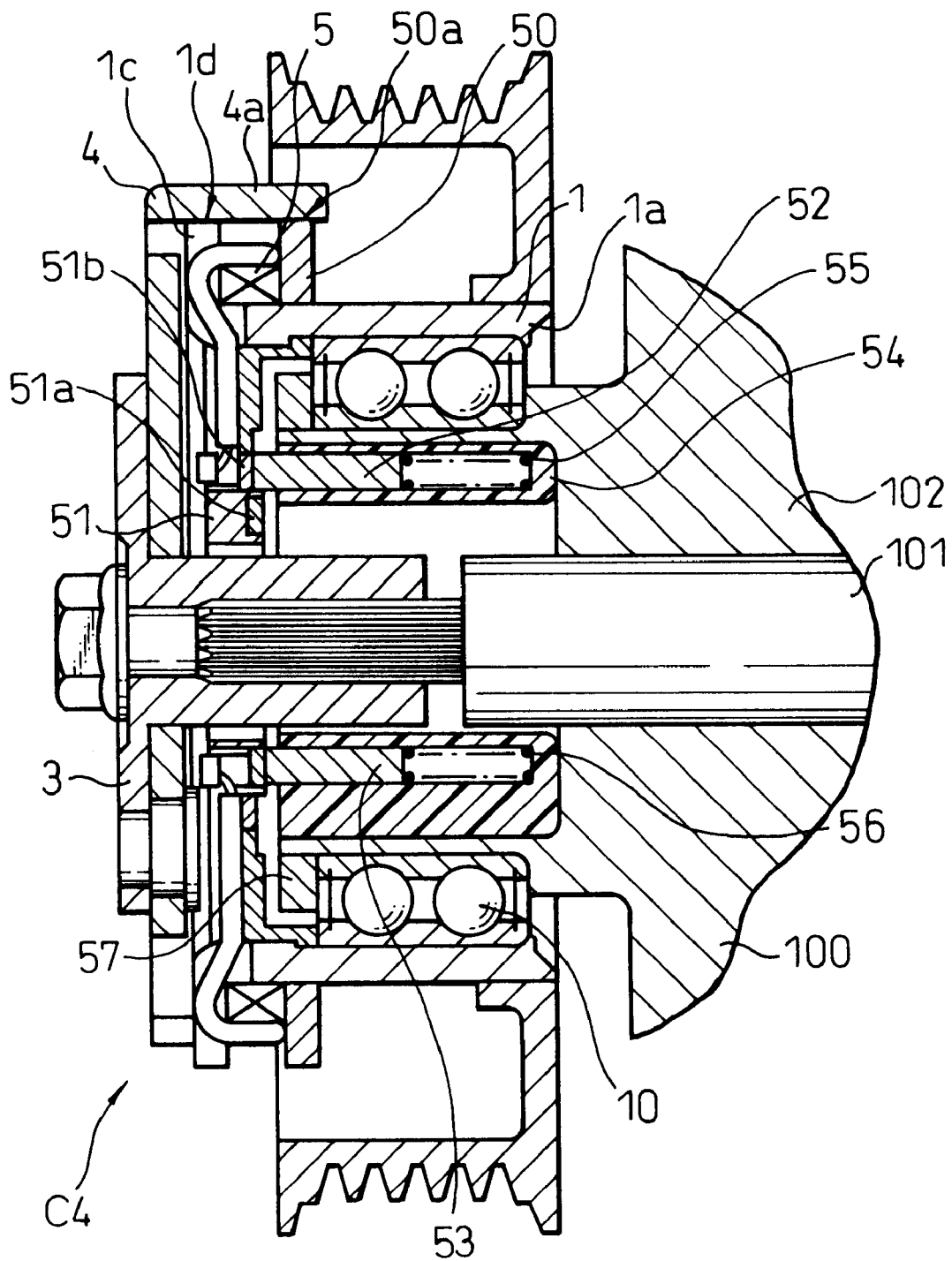
FIG. 11 is a longitudinal sectional view of a friction clutch according to a fourth embodiment.

Now, a detailed configuration and operation of the friction clutch C4 according to a fourth embodiment of the invention will be explained with reference to FIG. 11.

The friction clutch C1 according to the first embodiment is so formed that the electromagnetic coil 5 is fixed on the housing 12 of the compressor. In the friction clutch C4 according to the fourth embodiment, in contrast, the electromagnetic coil 5 is rotated with the rotor 1. As shown in FIG. 11, the rotor 1 includes a cylindrical portion 1*a* extending axially along the driven shaft 101 and a disk portion 1*c* extending radially. The rotor 1 therefore has an L-shaped section. In this case, the electromagnetic coil 5 is arranged on the outer periphery of the cylindrical portion 1*a* of the rotor 1, and rotates integrally with the rotor 1. Numeral 50 designates an annular coil stopper of magnetic material securely fixed on the outer periphery of the cylindrical portion 1*a* for supporting the electromagnetic coil 5 while at the same time forming a magnetic path with the rotor 1 and the armature portion 4*a* of the intermediate member 4 having the substantially same shape as the corresponding part of the first embodiment.

Numerals 51*a*, 51*b* designate slip rings for supplying power to the electromagnetic coil 5, which slip rings are mounted on a holder 51 of an insulating material such as synthetic resin. Since the holder 51 is mounted on the rotor 1, these parts are rotated integrally. The slip rings 51*a*, 51*b* are connected across the electromagnetic coil 5. Numerals 52, 53 designate brushes in sliding contact with the slip rings 51*a*, 51*b*, respectively. Numeral 54 designates a brush holder which is made of an insulating material, such as synthetic resin, for holding the brushes 52, 53 and is arranged fixedly on the compressor housing 102 between the cylindrical portion formed at the end of the compressor housing 102 and the end of the driven shaft 101. Numerals 55, 56 designate springs arranged behind the brushes 52, 53 in the axial holes formed in the brush holder 54 for pressing the brushes 52, 53 against the slip rings 51*a*, 51*b*, respectively. Numeral 57 designates a nut fixed at the forward end of the compressor housing 102 for restricting the motion, along the axis, of the bearing 10.

The friction clutch C4 according to the fourth embodiment has the configuration described above. Once power is supplied to the brushes 52, 53 from an external source, therefore, a current is supplied to the electromagnetic coil 5 through the slip rings 51*a*, 51*b* in sliding contact with the brushes 51*a*, 51*b*. The rotor 1, the coil stopper 50 and the armature portion 4*a* of the arm-like intermediate member 4 make up a magnetic path. The armature portion 4*a* is attracted by magnetic force toward the outer peripheral surface 1*d* of the disk portion 1*c* of the rotor 1 and the outer peripheral surface 50*a* of the coil stopper 50, thereby producing an effect substantially similar to that of the first embodiment. In the friction clutch C4 according to the fourth embodiment, the electromagnetic coil 5 is interposed between the rotor 1 having an L-shaped section and the annular coil stopper 50, thereby leading to the advantages that the shape of the rotary portions can be simplified and the slit 1*e* is not required unlike in the first embodiment.

Figure 12:
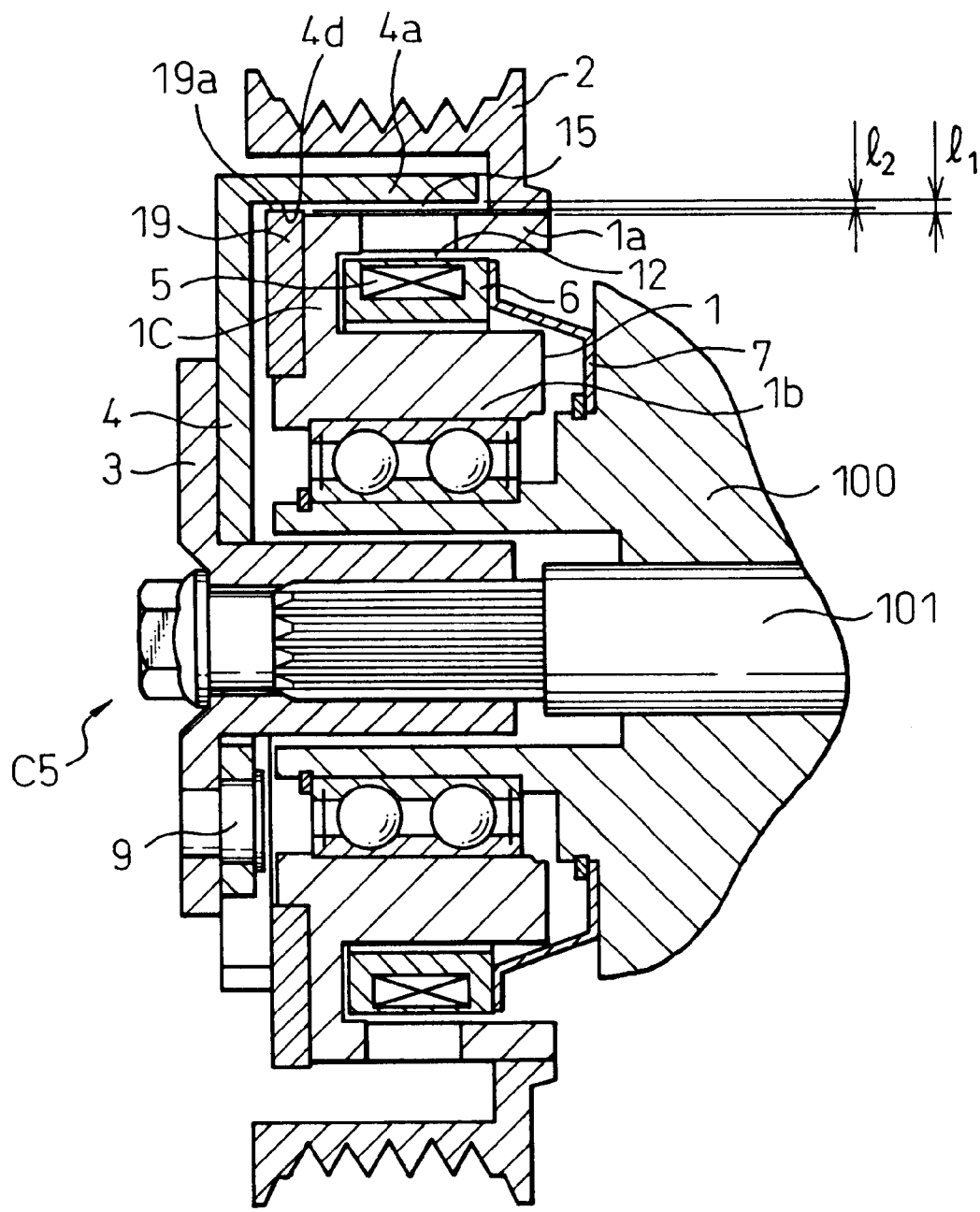
FIG. 12 is a longitudinal sectional view of a friction clutch according to a fifth embodiment.

Now, the configuration and the operation of the friction clutch C5 according to a fifth embodiment of the invention will be explained with reference to FIG. 12. FIG. 12 is a sectional view similar to FIG. 2 of the first embodiment. In the fifth embodiment, the component parts substantially similar to the corresponding parts of the preceding embodiment are designated by the same reference numerals, respectively, and will not be described again.

The main difference of the friction clutch C5 according to the fifth embodiment from the friction clutch C1 of the first embodiment shown in FIG. 2 lies in that a circular ring 19 providing a friction member is fitted in the rotor 1 under pressure or the like means. The circular ring 19 is made of a material high in hardness, and has the outer peripheral surface 19*a* forming a friction surface adapted to be in frictional engagement with the arcuate friction surface 4*d* formed on the inner surface of the armature portion 4*a* of the intermediate member 4. Thus, the outer peripheral surface of the outer cylindrical portion 1*a* of the rotor 1 is not required to frictionally engage the friction surface 4*d* of the intermediate member 4 and functions only as a magnetic pole surface for passing the magnetic fluxes. Therefore, the rotor 1 can be made of a ferromagnetic material lower in hardness than the circular ring 19. Also, the circular ring 19, the sole function of which is to form a friction surface, is required to be made of a material high in hardness to secure the resistance to wear and seizure, but is not required to be made of a ferromagnetic material.

The intermediate member 4 is pivotally mounted on a part of the boss 3 by the stepped pin 9 as in the first embodiment. While the friction clutch C5 is out of engagement, the inner surface of the armature portion 4*a* of the intermediate member 4 is opposed to the outer peripheral surface of the outer cylindrical portion 1*a* of the rotor 1 with a gap 15 of small length $l_1$ therebetween. The coil holder 6, the disk portion 1*c* of the rotor 1, the inner cylindrical portion 1*b*, the outer cylindrical portion 1*a* and the armature portion 4*a* of the intermediate member 4 make up a series of magnetic paths through which the magnetic fluxes generated in the electromagnetic coil 5 are allowed to pass. On the other hand, a shorter space having a length $l_2$ is formed between the outer peripheral surface of the circular ring 19 and the friction surface 4*d* of the intermediate member 4. This distance $l_2$ is reduced to zero when the friction clutch C5 is in engagement.

Upon energization of the electromagnetic coil 5, the armature portion 4*a* of the intermediate member 4 is attracted by the magnetic fluxes generated in the electromagnetic coil 5 so that the friction surface 4*d* comes into frictional engagement by contact with the friction surface 19*a* of the circular ring 19. The torque of the rotor 1 integral with the pulley 2 is transmitted to the driven shaft 101 through the intermediate member 4 and the boss 3. The friction force generated between the friction surface 4*d* and the friction surface 19*a* by the magnetic attraction force rotates the intermediate member 4 around the stepped pin 9. As a result, as in the first embodiment described with reference to FIG. 4, a pressure larger than the initial magnetic attraction force is exerted to press the friction surface 4*d* of the intermediate member 4 against the friction surface 19*a* of the circular ring 19, thereby further increasing the friction force. Even with a small magnetic attraction force of the electromagnetic coil 5, therefore, a large force for frictional engagement is obtained leading to the same effect as that of the first embodiment.

According to the fifth embodiment, the provision of the circular ring 19 for frictional engagement eliminates the requirement for the function of frictional engagement on for the magnetic pole surface constituting a part of the magnetic path (magnetic circuit) for transmitting the magnetic fluxes in the rotor unlike in the preceding embodiment. The rotor 1, therefore, can be made of a comparatively mild material small in magnetic reactance while holding a high magnetic properties. At the same time, the circular ring 19, in which no magnetic circuit is formed, can be made of a material such as high carbon steel or the hardness of the friction surface 19a can be improved by carburizing and quenching. In this way, seizure with the friction surface 4d can be positively prevented.

The configuration and the operation of the friction clutch C6 according to a sixth embodiment of the invention will be explained with reference to FIGS. 13 and 14. FIG. 14 is a sectional view taken in line XIV-0-XIV in FIG. 13. In each embodiment described above, the intermediate member 4 or 17 is pivotally supported on the boss integral with the driven shaft 101. The feature of the sixth embodiment, on the other hand, is that the intermediate member 4 is pivotally supported on the rotor 1 integral with the pulley 2 constituting a member on the drive side and that like in the fifth embodiment, the portion forming a magnetic path and the portion forming a frictional engaging unit are separated from each other. Most of the other points are shared by the first embodiment and with the same reference numerals attached, will not be described again.

Figure 13:
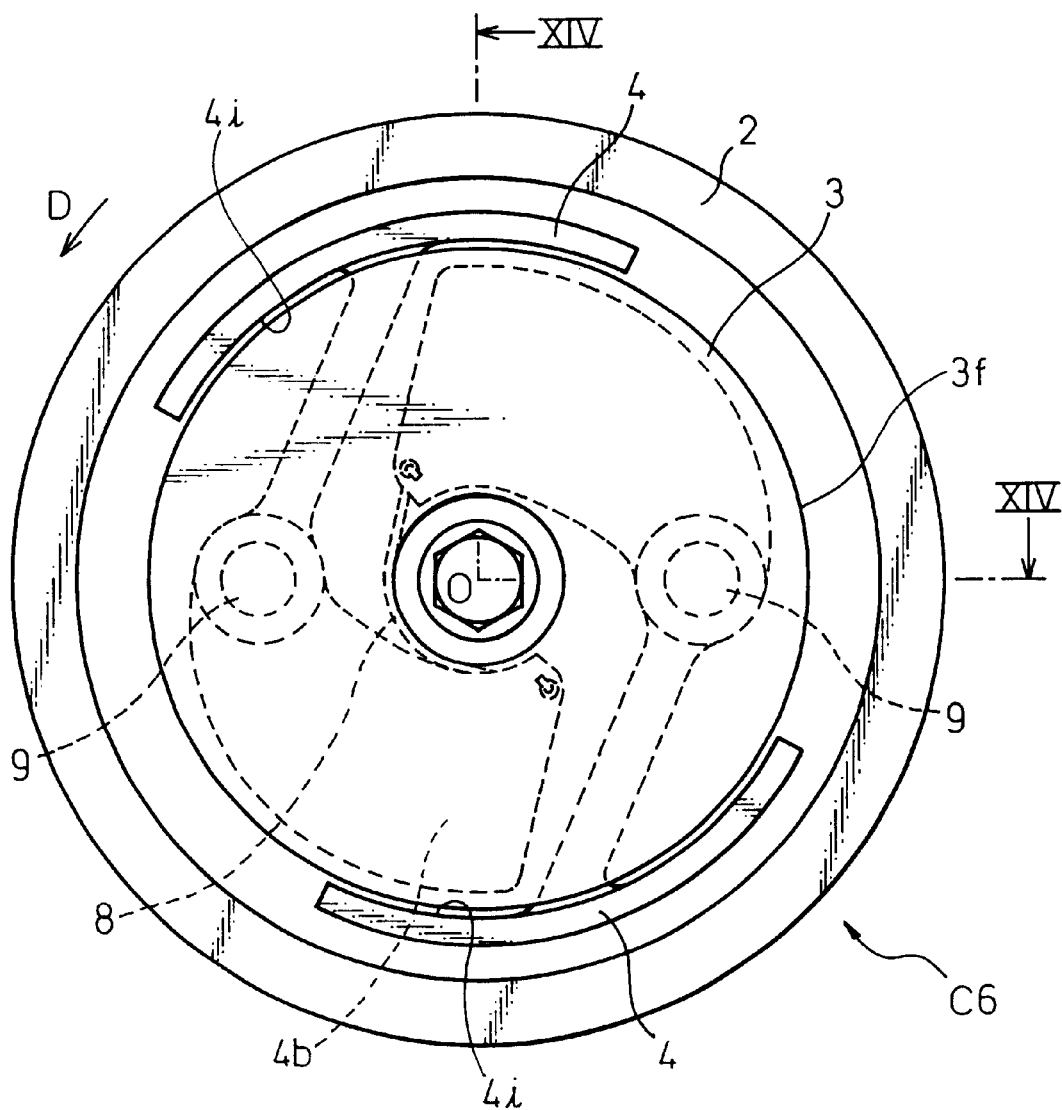
FIG. 13 is a front view of a friction clutch according to a sixth embodiment.
Figure 14:
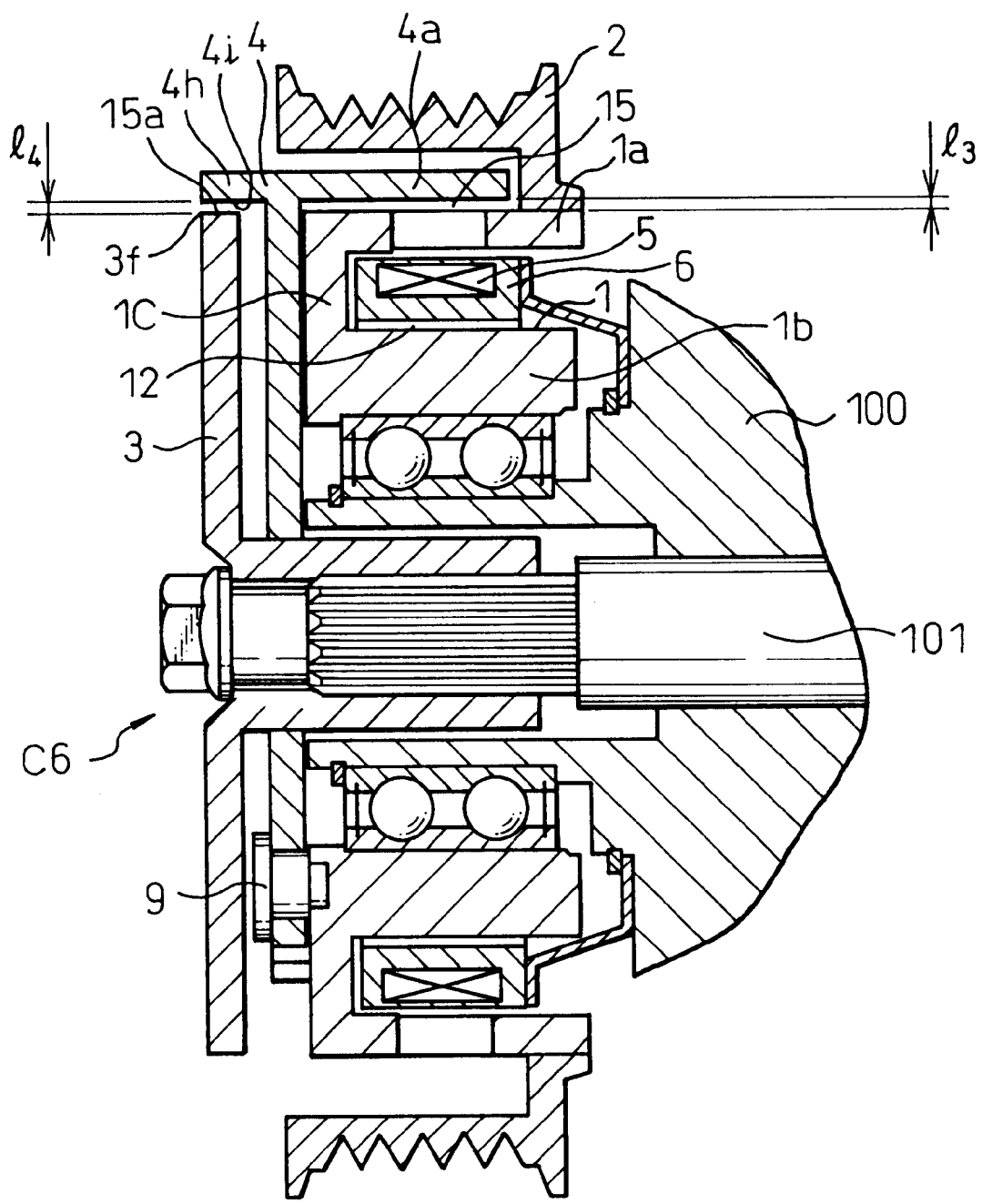
FIG. 14 is a sectional view of the friction clutch according to the sixth embodiment taken in line XIV-0-XIV in FIG. 13.

In the friction clutch C6 according to the sixth embodiment, as expressly shown in FIGS. 13 and 14, two intermediate members 4 having a substantially T-shaped section are each pivotally attached to the side of the inner cylindrical portion 1b of the rotor 1 by the stepped pin 9, respectively. As a result, while the friction clutch C is output of engagement, a space 15 of small distance $l_3$ is formed between the inner surface of the armature portion 4a of the intermediate member 4 and the outer peripheral surface of the outer cylindrical portion 1a. Together with this space 15, the coil holder 6, the disk portion 1c of the rotor 1, the inner cylindrical portion 1b, the outer cylindrical portion 1a and the armature portion 4a of the intermediate member 4 make up a series of magnetic paths. The magnetic fluxes generated in the electromagnetic coil 5 through this magnetic path, thereby generating an initial magnetic attraction force between the outer cylindrical portion 1a of the rotor 1 and the armature portion 4a of the intermediate member 4.

The friction engaging portion involved in power transmission is formed of an inner friction surface 4i of the arcuate portion 4h extending in axially opposite direction to the armature portion 4a of the intermediate member 4 and a friction surface $3_f$ on the outer peripheral surface of the boss 3 larger in diameter. Even when the friction clutch C6 is out of engagement, the distance $l_4$ of the space 15a between the friction surface $3_f$ and the friction surface 4i is set smaller than the distance $l_3$. When in engagement, however, the distance $l_4$ is reduced to zero.

As in each of the embodiments described above, when the friction clutch C6 in the sixth embodiment comes into engagement, the electromagnetic coil 5 is energized. The magnetic fluxes generated in the electromagnetic coil 5 cause the armature portion 4a of the intermediate member 4 to be magnetically attracted toward the outer cylindrical portion 1a of the rotor 1, and each intermediate member 4 rotates around the stepped pin 9. Thus the distance $l_4$ between the friction surfaces 3f and 4i is reduced to zero and the two friction surfaces come into contact with each other. Then, power begins to be transmitted to the boss 3 and hence the driven shaft 101 through the intermediate member 4 coupled to the rotor 1 integral with the pulley 2.

When the boss 3 is rotated by the pulley 2 and the rotor 1 through the intermediate members 4, the pulley 2 rotates in the direction of arrow D in FIG. 13. The friction surface 4i of the intermediate member 4 moves in such a manner as to wind around the friction surface 3f due to the torque transmission, and the friction surface 4i is strongly pressed against the friction surface 3f. Even when the magnetic attraction force generated by the electromagnetic coil 5 is small, therefore, a larger pressure is exerted between the two friction surfaces thereby making possible the transmission of a larger torque, as in the case of the friction clutch according to each of the embodiments described above. The operating principle of this phenomenon is similar to that of the first embodiment described above with reference to FIG. 4.

Lastly, an explanation will be given of the friction clutch C7 according to a seventh embodiment of the invention shown in FIGS. 15 and 16. FIG. 16 is a sectional view taken in line XVI-0-A-B-XVI in FIG. 15. The main feature of the friction clutch C7 according to the seventh embodiment is the provision of two types of friction surfaces at the same time. The first friction surface, like in the first embodiment, functions as a part (magnetic pole surface) of the magnetic circuit, and the second friction surface has the sole function of transmitting power regardless of the magnetic circuit. Another feature of the friction clutch C7 is that a rubber member is interposed between the surface of the pin rotatably supporting the intermediate member and the inner surface of the hole of the boss through which the pin is inserted, in order to prevent the phenomenon called fretting wear or fretting corrosion of these surfaces. Substantially the same component parts as the corresponding parts of the embodiments described above are designated by the same reference numerals, respectively, and will not be described again.

Figure 15:
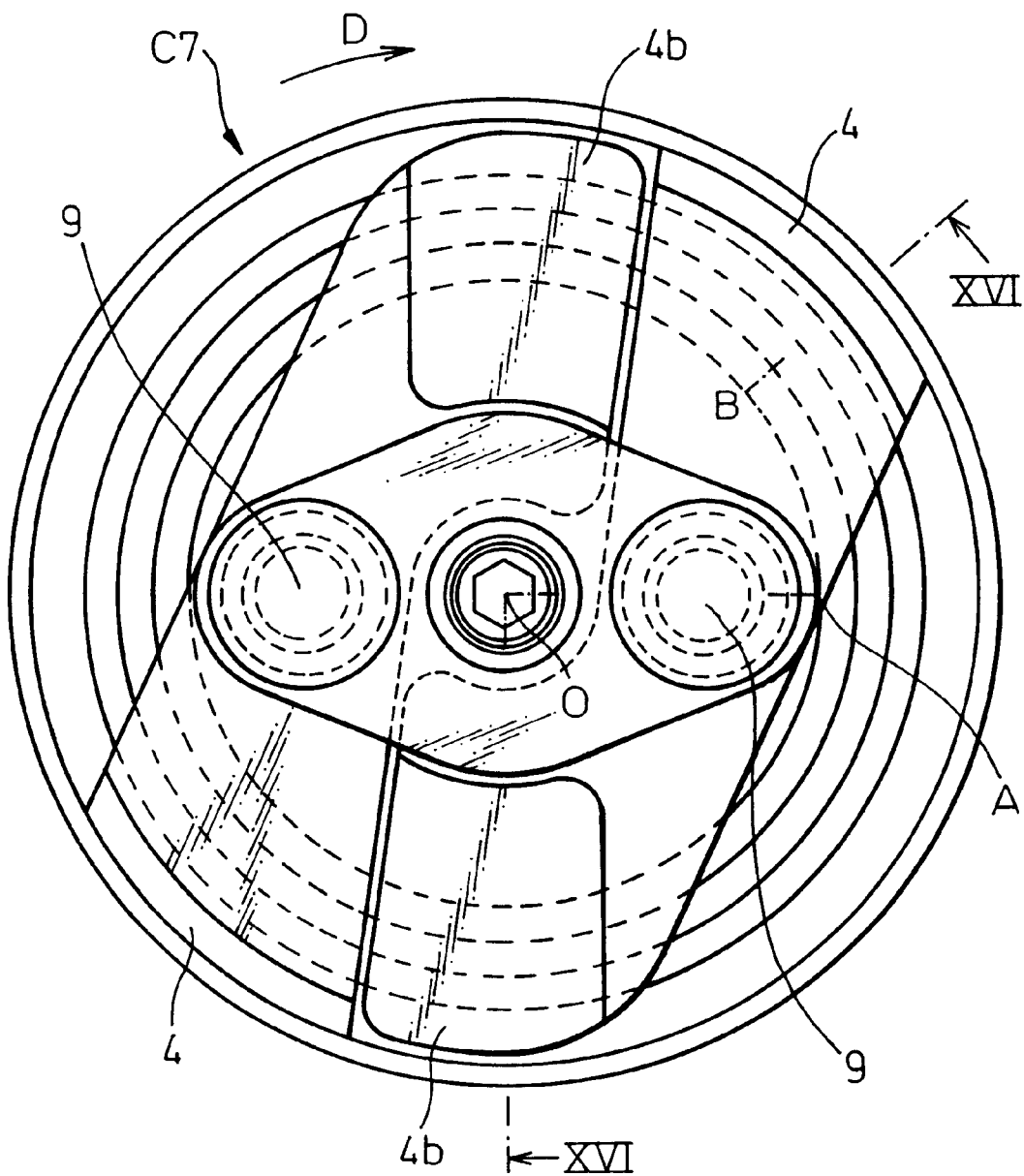
FIG. 15 is a front view of the friction clutch according to a seventh embodiment.
Figure 16:
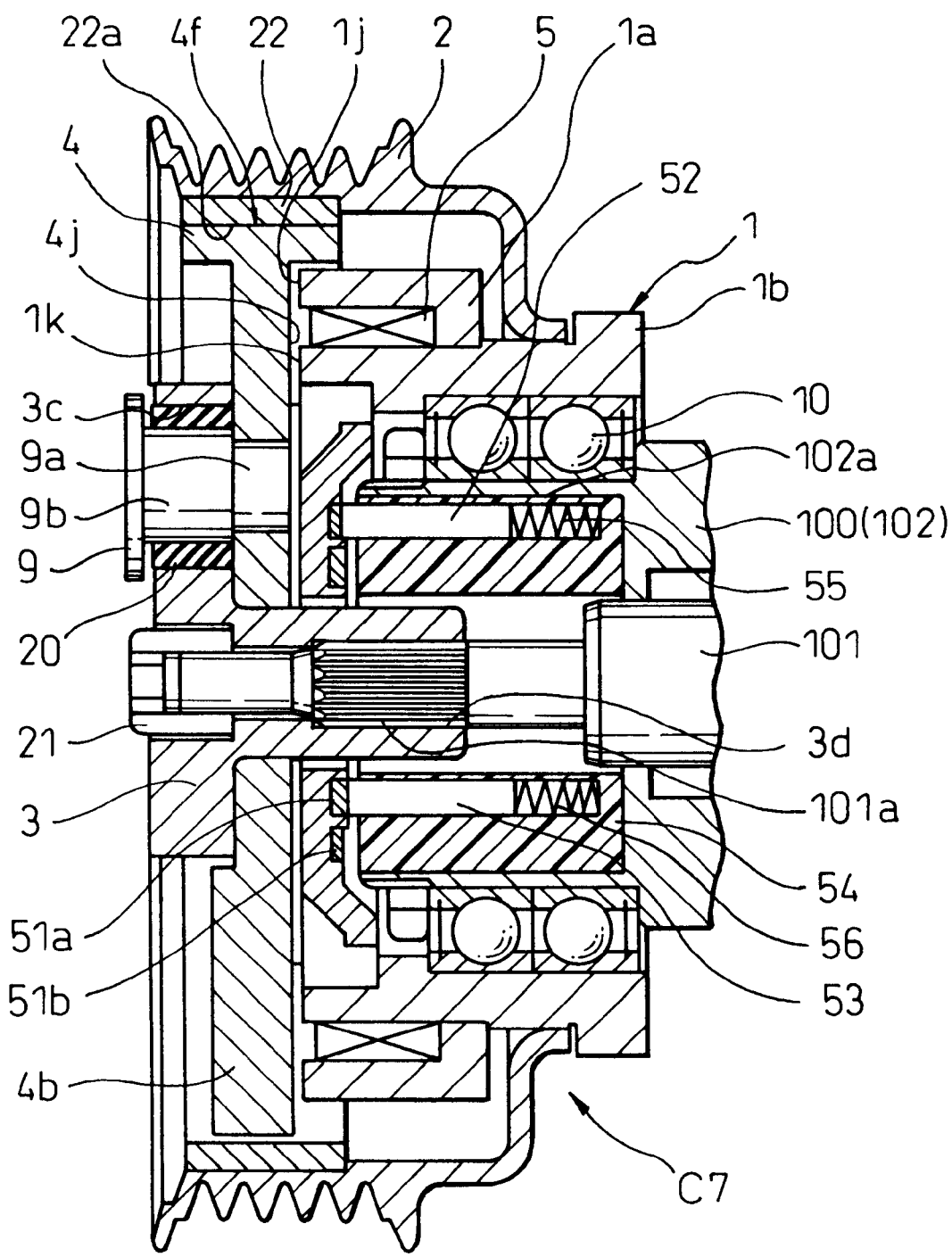
FIG. 16 is a sectional view of the friction clutch according to the seventh embodiment taken in line XVI-0-A-B-XVI in FIG. 15.
Figure 17:
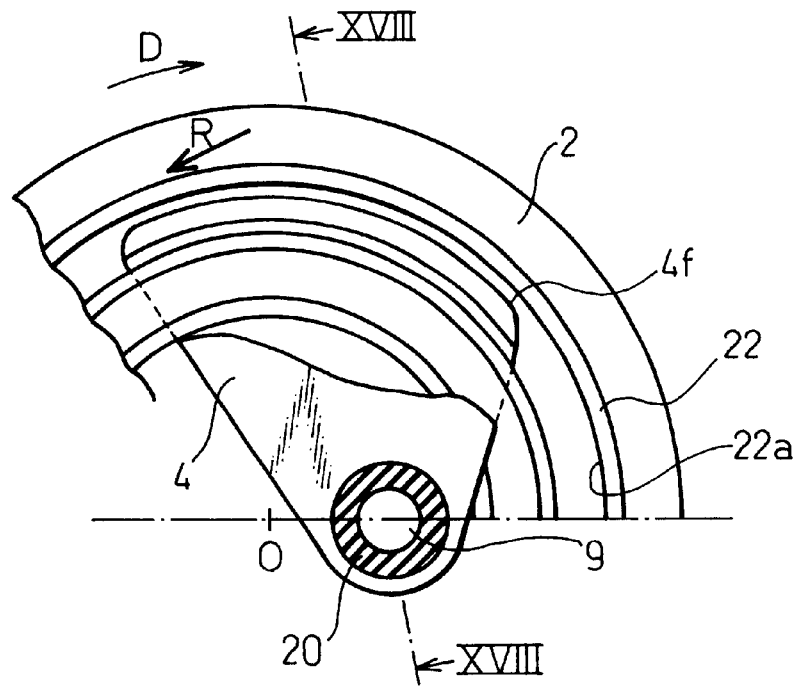
FIG. 17 is a front view schematically showing a part of FIG. 15 with the friction clutch out of engagement according to the seventh embodiment.
Figure 18:
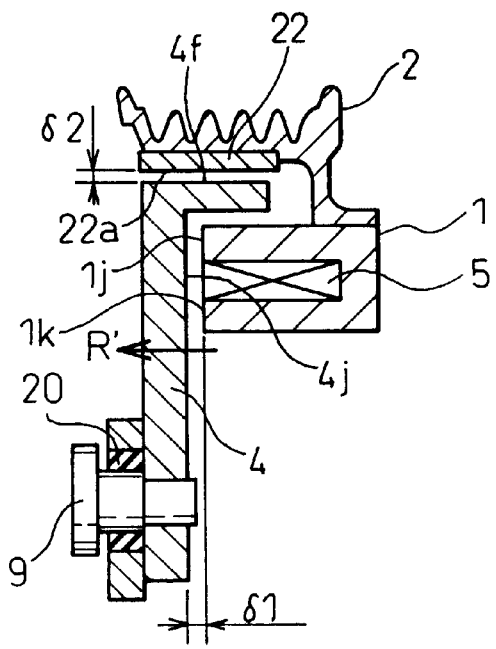
FIG. 18 is a front view schematically showing a part of FIG. 16 with the friction clutch out of engagement according to the seventh embodiment.

As shown in FIGS. 15 and 16, according to the seventh embodiment, the section of the annular outer cylindrical portion 1a and the inner cylindrical portion 1b forming a part of the rotor 1 is U-shaped in such a manner as to substantially surround the electromagnetic coil 5, and the end surfaces of the outer cylindrical portion 1a and the inner cylindrical portion 1b constitute the friction surfaces 1j and 1k, respectively. However, the friction surfaces 1j and 1k, which are not main frictional power transmission surfaces, requires no high degree of hardness, and therefore a mild magnetic material superior in magnetic properties, though low in wear resistance, can be selected as the material of the rotor 1. The rotor 1 is pressure fitted integrally into the pulley 2. Also, the inner ring of the bearing 10 rotatably supporting the rotor 1 is securely fitted on the cylindrical protrusion 102a formed on the housing 102 of the refrigerant compressor 100.

A pair of the intermediate members 4 have substantially the same tabular shape. The surface portion of the intermediate members 4 in an opposed relation to the friction surfaces 1j, 1k at the end of the rotor 1 is formed with a friction surface 4j adapted to contact the aforementioned friction surfaces. Also, an arcuate friction surface 4f constituting the main frictional power transmission surface is formed at a radial end of the intermediate member 4, and a balancer 4b at the other end thereof. In order to support the intermediate member 4, the small diameter portion 9a of the stepped pin 9 is firmly press-fitted in the hole of the intermediate member 4, and at the same time the large diameter portion 9b of the stepped pin 9 is inserted in the hole 3c of the boss 3 through a hollow cylindrical rubber 20. With the deformation of the rubber 20, the intermediate member 4 can rotate within a predetermined angular range with respect to the boss 3 and at the same time can be axially moved within a predetermined distance. In this case, too, the pair of the two intermediate members 4 are arranged 180° apart from each other.

The boss 3 is coupled to an end of the driven shaft 101. The boss 3 has a serration 3d which, in mesh with the serration 101a on the driven shaft 101, transmits a torque. Numeral 22 designates a hollow cylindrical friction member press-fitted inside of the pulley 2 located in opposed relation to the friction surface 4f of the intermediate member 3. The friction member 22 is desirably formed of a material high in adhesion resistance such as phosphor bronze or an iron material improved in hardness by carburizing and quenching. As in the fourth embodiment shown in FIG. 11, brushes 52, 53 made of a rod-like conductor are slidably inserted in the axial holes of the brush holder 54 of an insulating material such as synthetic resin mounted on the housing 102 of the compressor 100. The brushes 52, 53 are pressed by the springs 55, 56 against the slip rings 51a, 51b mounted on the holder 51 rotating on the rotor 1. Thus, the electromagnetic coil 5 rotating with the rotor 1 is supplied with power.

Now, the manner in which the friction clutch C7 according to the seventh embodiment operates will be explained with reference to FIGS. 17 to 22. The component parts shown in these schematic diagrams, in which the parts not necessary for explanation are not shown, may fail to coincide with the corresponding parts of FIGS. 15 and 16. At the time of separation (disengagement) shown in FIGS. 17 and 18, predetermined clearances δ1, δ2 are formed between the friction surfaces 1j, 1k of the rotor 1 and the friction surface 4j of the intermediate member 4 on the one hand and between the friction surface 22a of the friction member 22 arranged on a pulley 2 integrated with the rotor 1 and the friction surface 4f of the intermediate member 4 on the other hand, respectively. Therefore, the torque is not transmitted to the driven shaft 101 from the rotor 1 integrated with the pulley 2. This disengaged state is maintained as the intermediate member 4 is urged in the direction designated by R, R' under the elastic restoring power of the rubber 20.

Figure 19:
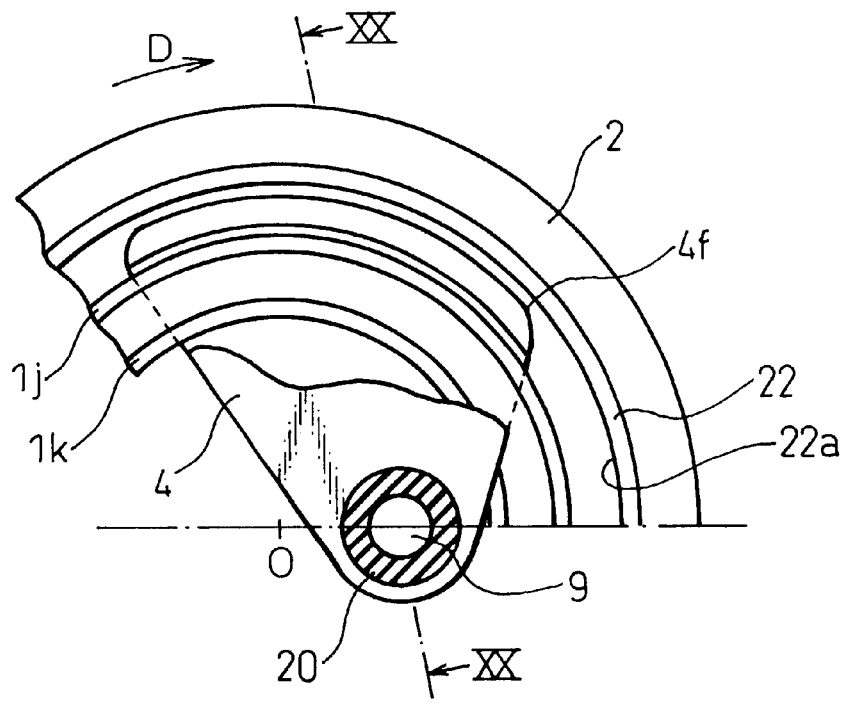
FIG. 19 is a front view schematically showing a part of FIG. 15 with the friction clutch in engagement according to the seventh embodiment.
Figure 20:
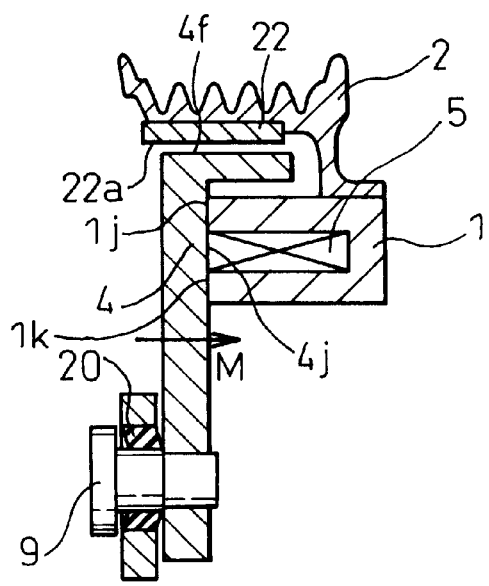
FIG. 20 is a front view schematically showing a part of FIG. 16 with the friction clutch in engagement according to the seventh embodiment.

Upon magnetization of the rotor 1 by the current supplied through the brushes 52, 53 to the electromagnetic coil 5 in rotation, the intermediate member 4 is attracted in the direction indicated by arrow M. The rubber 30 thus deformed moves in axial direction so that the friction surfaces 1j, 1k of the rotor 1 come into contact with the friction surface 4j of the intermediate member 4. This state is shown in FIGS. 19 and 20.

Figure 21:
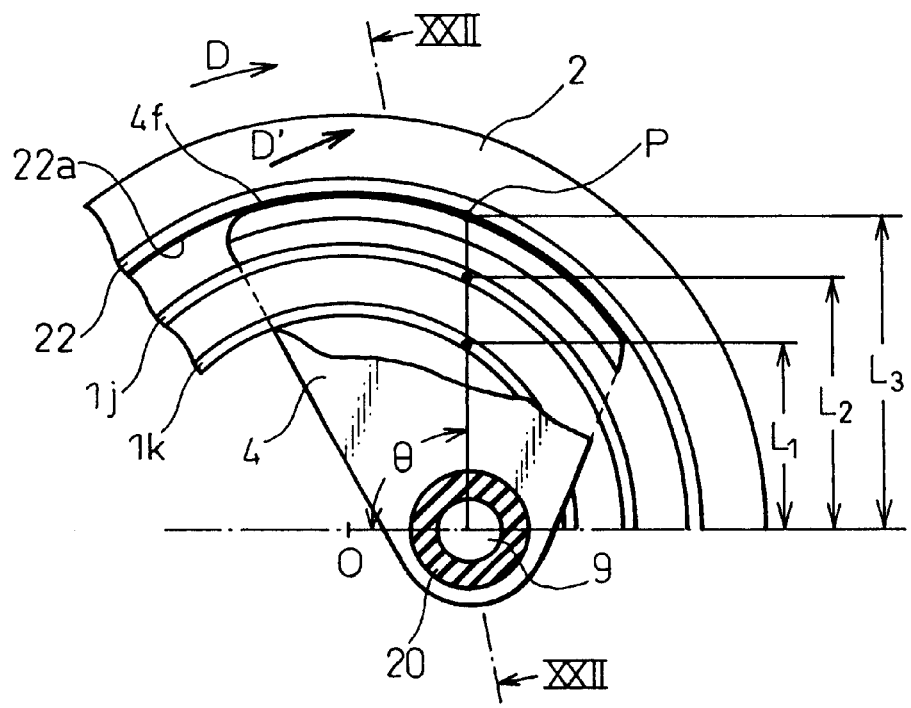
FIG. 21 is a front view schematically showing a part of FIG. 15 with the friction clutch in engagement according to the seventh embodiment.
Figure 22:
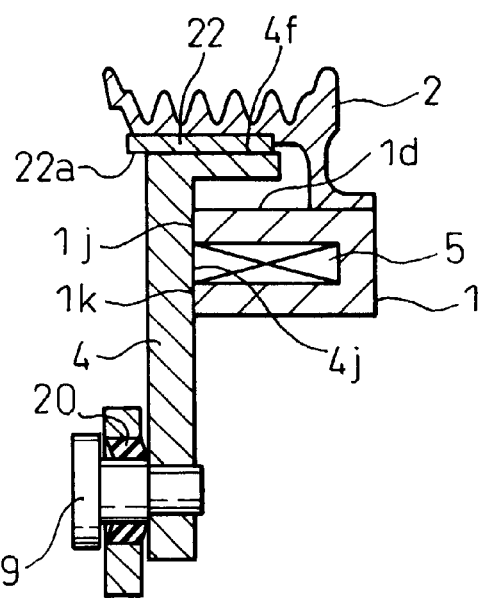
FIG. 22 is a front view schematically showing a part of FIG. 16 with the friction clutch in engagement according to the seventh embodiment

The pulley 2 and the rotor 1 rotate in the direction D, and therefore a friction force corresponding to the magnitude of the magnetic attraction force due to the electromagnetic coil 5 is generated on the contact surface between the friction surfaces 1j, 1k of the rotor 1 and the friction surface 4j of the intermediate member 4. This friction force 4 acts on the intermediate member 4 as a moment about the pin 9, and therefore the intermediate member 4 rotates around the pin 9. Thus the friction surface 4f of the intermediate member 4 is firmly pressed against the friction surface 22a of the friction member 22 arranged on the pulley 2 integral with the rotor 1. This state is shown in FIGS. 21 and 22. The firm contact between the friction surfaces 4f and 22a causes the intermediate member 4 to rotate integrally with the pulley 2 rotating along the direction D, so that the torque of the pulley 2 is transmitted to the driven shaft 101.

In this way, the torque, when transmitted from the friction member 22 of the pulley 2 to the intermediate member 4 along the direction D, works to rotate the intermediate member 4 along the direction D' about the pin 9 and, therefore, the pressure imparted from the friction surface 4f of the intermediate member 4 against the friction surface 22a of the friction member 22 is further strengthened. As a result, a large friction force is generated between the friction surface 4f and the friction surface 22a, thereby making it possible to transmit a very large torque. The friction force or the torque thus generated is much larger than the friction force or the torque, as the case may be, generated between the friction surfaces 1j, 1k and the friction surface 4j by the attraction of the electromagnetic coil 5 or generated between the friction surfaces 22a and 4f simply pressed against each other in radial direction. In such a case, however, the friction surfaces 4f and 22a of the intermediate member 4 are not included in the magnetic circuit. Therefore, the material of these parts can be selected or subjected to the surface treatment as required in consideration of the adhesion resistance and wear resistance without taking the magnetic properties thereof into account.

Under this condition, the maximum pressure Nmax is given as $$N_{max}=f(L_1, L_2, L_3, \theta, \mu_1, \mu_2)\cdot F_m \qquad (4)$$

where f is a function, $L_1$ the distance from the center of the pin 9 to the friction surface 1k, $L_2$ the distance from the center of the pin 9 to the friction surface 1j, $L_3$ the distance from the center of the pin 9 to the center point P of contact between the friction surfaces 4f and 22a, θ an angle formed by a reference straight line such as the straight line connecting the center of the pin 9 to the center O of the driven shaft 101 and the straight line connecting the center of the pin 9 to the center point P of contact, $\mu_1$ the static coefficient of friction between the friction surfaces 1j, 1k and the friction surface 4j, $\mu_2$ the static coefficient of friction between the friction surfaces 4f and 22a, and Fm the magnitude of the electromagnetic force.

Thus, the maximum pressure Nmax is f times as large as the electromagnetic force Fm. As a result, a large friction force is generated between the friction surfaces 4f and 22a, so that the torque of the pulley 2 and the rotor 1 is transmitted from the intermediate member 4 to the pin 9, from which it is further transmitted to the boss through the rubber 20, and to the driven shaft 101 through the serrations 3d and 101a. The load imposed on the bearing 10 by the large pressure Nmax in the process is offset by the symmetric arrangement of the two intermediate members 4 about the driven shaft 101. Therefore, no special reinforcement of the bearing 10 is required.

In restoring the friction clutch C7 from the engaged state shown in FIGS. 21 and 22 to the disengaged state shown in FIGS. 19 and 20, all that is needed is to stop power supply to the electromagnetic coil 5. The friction surfaces 4f and 22a (friction member 22) can be made of a material of low adhesion or be surface treated for reducing the adhesion without taking the magnetic properties thereof into consideration. Thus, while preventing the friction surfaces from being adhered, the intermediate members 4 are moved in rotational and axial directions indicated by arrows R and R' by the elastic restoring power of the rubber 20 and the friction surfaces thus far in contact are separated from each other, with the result that the torque transmission by the friction clutch C7 is completely stopped.

What is claimed is:

1. A friction clutch comprising:
   a rotor having a first friction surface supported rotatably around a driven shaft and rotated by an external driving force;
   a boss mounted on said driven shaft;
   an intermediate member having a second friction surface pivotally mounted on said boss and adapted to come into engaging contact with the first friction surface of said rotor for converting the friction force generated by the first friction surface of said rotor into the pressure against said rotor; and initial operating means for exerting an initial force directly on said intermediate member for pressing the second friction surface of said intermediate member against the first friction surface of said rotor.

2. A friction clutch according to claim 1,
wherein said intermediate member having said second friction surface is movable toward said first friction surface, and the direction of movement of said intermediate member has a-component along the normal to said first friction surface so that a larger force for pressing said second friction surface against said first friction surface is generated by the initial friction force generated by the initial torque transmitted with said two friction surfaces kept in contact with each other by the operation of said initial operating means.

3. A friction clutch according to claim 2,
wherein said second friction surface of said intermediate member is arcuate, and the point where said intermediate member is rotatably and pivotally mounted is displaced from the center of rotation of said first friction surface so that the direction of movement of said intermediate member has a component along the normal to said first friction surface.

4. A friction clutch according to claim 1,
wherein said initial operating means includes an armature portion made of a magnetic material formed on said intermediate member and an electromagnetic coil for magnetically attracting said armature portion.

5. A friction clutch according to claim 4,
wherein said electromagnetic coil is immovably supported.

6. A friction clutch according to claim 4,
wherein said electromagnetic coil is supported to rotate integrally with said rotor, and said electromagnetic coil is supplied with power by a sliding contact mechanism including a brush and slip ring.

7. A friction clutch according to claim 6,
wherein said rotor includes a cylindrical portion extending in axial direction and a disk portion extending in radial direction, said rotor thus having an L-shaped section, an annular coil stopper is fitted on the cylindrical portion of said rotor, and said electromagnetic coil is arranged between said disk portion of said rotor and said coil stopper.

8. A friction clutch according to claim 4,
wherein at least one of said intermediate member and said rotor has a friction surface for transmitting the torque and a magnetic pole surface separate from said friction surface for forming a magnetic path.

9. A friction clutch according to claim 4,
wherein said intermediate member is also slightly movable along the axis of said driven shaft, said friction surface for transmitting the torque includes a friction surface of a friction member mounted on said rotor and a friction surface formed at an end of said intermediate member in an opposed relation to said friction surface of said rotor, and
wherein said magnetic pole surface for forming a magnetic path substantially has a friction surface formed at an axial end of said rotor and a friction surface formed on a tabular surface on one side of said intermediate member in an opposed relation to said friction surface of said rotor.

10. A friction clutch according to claim 9,
wherein said friction member is mounted on the inner surface of said pulley integral with said rotor.

11. A friction clutch according to claim 9, further comprising an elastic member interposed between a pin shaft and a hole for receiving said pin shaft in order to rotatably support said intermediate member in such a manner as to be slightly movable along the axis of said driven shaft.

12. A friction clutch according to claim 1,
wherein said first friction surface is formed on said rotor in a position perpendicular to said driven shaft, and said second friction surface is formed on said intermediate member in an opposed relation to said first friction surface.

13. A friction clutch according to claim 1, comprising a plurality of said intermediate members arranged around said driven shaft in such positions that each adjoining pair of said intermediate members makes the same angle.

14. A friction clutch according to claim 1, comprising a plurality of said intermediate members,
wherein an elastic member is mounted between an end of one intermediate member and an end of another intermediate member in order to urge said second friction surface formed on said intermediate member away from said first friction surface.

15. A friction clutch according to claim 1, wherein a balancer is mounted on said intermediate member in order that the center of gravity of said intermediate member coincides with the rotational center of said intermediate member.

16. A friction clutch comprising:
a rotor having a first friction surface supported rotatably around a driven shaft and rotated by an external driving force;
a boss mounted on said driven shaft;
a plurality of intermediate members, each intermediate member having a second friction surface pivotally mounted on said boss and adapted to come into engaging contact with the first friction surface of said rotor for converting the friction force generated by the first friction surface of said rotor into the pressure against said rotor; and
initial operating means for exerting an initial force on said intermediate member for pressing the second friction surface of said intermediate member against the first friction surface of said rotor;
wherein an elastic member is mounted between an end of one intermediate member and an end of another intermediate member in order to urge said second friction surface formed on said intermediate member away from said first friction surface.

17. A friction clutch comprising:
a rotor having a first friction surface supported rotatably around a driven shaft and rotated by an external driving force;
a boss mounted on said driven shaft;
an intermediate member having a second friction surface pivotally mounted on said boss and adapted to come into engaging contact with the first friction surface of said rotor for converting the friction force generated by the first friction surface of said rotor into the pressure against said rotor; and
initial operating means for exerting an initial force on said intermediate member for pressing the second friction surface of said intermediate member against the first friction surface of said rotor;
wherein a balancer is mounted on said intermediate member in order that the center of gravity of said intermediate member coincides with the rotational center of said intermediate member.

* * * * *